United States Patent
Wollrath et al.

(10) Patent No.: US 6,728,737 B2
(45) Date of Patent: *Apr. 27, 2004

(54) METHOD AND SYSTEM FOR LEASING STORAGE

(75) Inventors: Ann M. Wollrath, Groton, MA (US); James H. Waldo, Dracut, MA (US); Kenneth C. R. C. Arnold, Lexington, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/075,261

(22) Filed: Feb. 15, 2002

(65) Prior Publication Data

US 2002/0116383 A1 Aug. 22, 2002

Related U.S. Application Data

(63) Continuation of application No. 09/690,472, filed on Oct. 18, 2000, now Pat. No. 6,519,615, which is a continuation of application No. 09/044,923, filed on Mar. 20, 1998, now Pat. No. 6,263,350, which is a continuation-in-part of application No. 08/729,421, filed on Oct. 11, 1996, now Pat. No. 5,832,529.
(60) Provisional application No. 60/076,048, filed on Feb. 26, 1998.

(51) Int. Cl.$^7$ .............................................. G06F 17/30

(52) U.S. Cl. ........................... 707/206; 707/9; 707/10; 707/103; 709/203; 709/104

(58) Field of Search ..................... 707/10, 201, 206, 707/9, 103, 103 R, 103 Y, 202, 203; 709/104, 203

(56) References Cited

U.S. PATENT DOCUMENTS

| 4,430,699 A | 2/1984 | Segarra et al. ............. 709/230 |
| 4,491,946 A | 1/1985 | Kryskow, Jr. et al. ...... 370/453 |
| 4,558,413 A | 12/1985 | Schmidt et al. ............ 707/203 |
| 4,567,359 A | 1/1986 | Lockwood .................. 235/381 |

(List continued on next page.)

FOREIGN PATENT DOCUMENTS

| EP | 0 300 516 A2 | 1/1989 |
| EP | 0 351 536 A3 | 1/1990 |
| EP | 0 384 339 A3 | 8/1990 |

(List continued on next page.)

OTHER PUBLICATIONS

Cary G. Gray and David R. Cheriton, "Leases: An Efficient Fault–Tolerant Mechanism for Distributed File Cache Consistency", ACM, pp. 202–210. 1989.*

(List continued on next page.)

Primary Examiner—John E. Breene
Assistant Examiner—Cheryl Lewis
(74) Attorney, Agent, or Firm—Finnegan, Henderson, Farabow, Garrett & Dunner, L.L.P.

(57) ABSTRACT

A method and system for leasing storage locations in a distributed processing system is provided. Consistent with this method and system, a client requests access to storage locations for a period of time (lease period) from a server, such as the file system manager. Responsive to this request, the server invokes a lease period algorithm, which considers various factors to determine a lease period during which time the client may access the storage locations. After a lease is granted, the server sends an object to the client that advises the client of the lease period and that provides the client with behavior to modify the lease, like canceling the lease or renewing the lease. The server supports concurrent leases, exact leases, and leases for various types of access. After all leases to a storage location expire, the server reclaims the storage location.

73 Claims, 12 Drawing Sheets

U.S. PATENT DOCUMENTS

| | | | |
|---|---|---|---|
| 4,713,806 A | 12/1987 | Oberlander et al. | 370/358 |
| 4,809,160 A | 2/1989 | Mahon et al. | 713/200 |
| 4,823,122 A | 4/1989 | Mann et al. | 340/825.28 |
| 4,939,638 A | 7/1990 | Stephenson et al. | 710/244 |
| 4,956,773 A | 9/1990 | Saito et al. | 717/104 |
| 4,992,940 A | 2/1991 | Dworkin | 705/26 |
| 5,088,036 A | 2/1992 | Ellis et al. | 707/206 |
| 5,109,486 A | 4/1992 | Seymour | 709/224 |
| 5,187,787 A | 2/1993 | Skeen et al. | 709/314 |
| 5,218,699 A | 6/1993 | Brandle et al. | 709/328 |
| 5,253,165 A | 10/1993 | Leiseca et al. | 705/5 |
| 5,257,369 A | 10/1993 | Skeen et al. | 709/312 |
| 5,293,614 A | 3/1994 | Ferguson et al. | 707/201 |
| 5,297,283 A | 3/1994 | Kelly, Jr. et al. | 709/104 |
| 5,307,490 A | 4/1994 | Davidson et al. | 709/328 |
| 5,311,591 A | 5/1994 | Fischer | 713/156 |
| 5,319,542 A | 6/1994 | King, Jr. et al. | 705/27 |
| 5,327,559 A | 7/1994 | Priven et al. | 709/101 |
| 5,339,435 A | 8/1994 | Lubkin et al. | 717/121 |
| 5,386,568 A | 1/1995 | Wold et al. | 717/162 |
| 5,390,328 A | 2/1995 | Frey et al. | 709/315 |
| 5,392,280 A | 2/1995 | Zheng | 370/353 |
| 5,423,042 A | 6/1995 | Jalili et al. | 709/328 |
| 5,440,744 A | 8/1995 | Jacobson et al. | 709/203 |
| 5,448,740 A | 9/1995 | Kiri et al. | 717/155 |
| 5,452,459 A | 9/1995 | Drury et al. | 707/3 |
| 5,455,952 A | 10/1995 | Gjovaag | 717/108 |
| 5,471,629 A | 11/1995 | Risch | 707/201 |
| 5,475,792 A | 12/1995 | Stanford et al. | 704/233 |
| 5,475,817 A | 12/1995 | Waldo et al. | 709/316 |
| 5,475,840 A | 12/1995 | Nelson et al. | 709/331 |
| 5,481,721 A | 1/1996 | Serlet et al. | 709/315 |
| 5,504,921 A | 4/1996 | Dev et al. | 709/223 |
| 5,511,196 A | 4/1996 | Shackelford et al. | 709/315 |
| 5,511,197 A | 4/1996 | Hill et al. | 709/328 |
| 5,524,244 A | 6/1996 | Robinson et al. | 717/140 |
| 5,544,040 A | 8/1996 | Gerbaulet | 705/26 |
| 5,548,726 A | 8/1996 | Pettus | 709/221 |
| 5,553,282 A | 9/1996 | Parrish et al. | 707/10 |
| 5,555,367 A | 9/1996 | Premerlani et al. | 707/4 |
| 5,555,427 A | 9/1996 | Aoe et al. | 709/201 |
| 5,557,798 A | 9/1996 | Skeen et al. | 705/35 |
| 5,560,003 A | 9/1996 | Nilsen et al. | 707/206 |
| 5,561,785 A | 10/1996 | Blandy et al. | 711/170 |
| 5,577,231 A | 11/1996 | Scalzi et al. | 703/26 |
| 5,592,375 A | 1/1997 | Salmon et al. | 705/7 |
| 5,594,921 A | 1/1997 | Pettus | 710/11 |
| 5,603,031 A | 2/1997 | White et al. | 709/317 |
| 5,617,537 A | 4/1997 | Yamada et al. | 709/214 |
| 5,628,005 A | 5/1997 | Hurvig | 707/8 |
| 5,640,564 A | 6/1997 | Hamilton et al. | 709/315 |
| 5,644,768 A | 7/1997 | Periwal et al. | 709/102 |
| 5,652,888 A | 7/1997 | Burgess | 709/318 |
| 5,655,148 A | 8/1997 | Richman et al. | 710/8 |
| 5,659,751 A | 8/1997 | Heninger | 709/332 |
| 5,664,110 A | 9/1997 | Green et al. | 705/26 |
| 5,664,111 A | 9/1997 | Nahan et al. | 705/27 |
| 5,666,493 A | 9/1997 | Wojcik et al. | 705/26 |
| 5,671,225 A | 9/1997 | Hooper et al. | 370/468 |
| 5,671,279 A | 9/1997 | Elgamal | 705/79 |
| 5,675,796 A | 10/1997 | Hodges et al. | 709/100 |
| 5,675,797 A | 10/1997 | Chung et al. | 709/104 |
| 5,680,573 A | 10/1997 | Rubin et al. | 711/129 |
| 5,680,617 A | 10/1997 | Gough et al. | 707/104.1 |
| 5,684,955 A | 11/1997 | Meyer et al. | 709/316 |
| 5,689,709 A | 11/1997 | Corbett et al. | 709/315 |
| 5,694,551 A | 12/1997 | Doyle et al. | 705/26 |
| 5,706,435 A | 1/1998 | Barbara et al. | 711/141 |
| 5,706,502 A | 1/1998 | Foley et al. | 707/10 |
| 5,710,887 A | 1/1998 | Chelliah et al. | 705/26 |
| 5,715,314 A | 2/1998 | Payne et al. | 705/78 |
| 5,721,832 A | 2/1998 | Westrope et al. | 705/27 |
| 5,724,540 A | 3/1998 | Kametani | 711/220 |
| 5,724,588 A | 3/1998 | Hill et al. | 709/328 |
| 5,727,048 A | 3/1998 | Hiroshima et al. | 379/93.12 |
| 5,727,145 A | 3/1998 | Nessett et al. | 713/200 |
| 5,729,594 A | 3/1998 | Klingman | 379/93.12 |
| 5,737,607 A | 4/1998 | Hamilton et al. | 709/316 |
| 5,742,768 A | 4/1998 | Gennaro et al. | 1/1 |
| 5,745,678 A | 4/1998 | Herzberg et al. | 713/200 |
| 5,745,695 A | 4/1998 | Gilchrist et al. | 709/227 |
| 5,745,703 A | 4/1998 | Cejtin et al. | 709/238 |
| 5,745,755 A | 4/1998 | Covey | 707/203 |
| 5,748,897 A | 5/1998 | Katiyar | 709/219 |
| 5,754,849 A | 5/1998 | Dyer et al. | 707/101 |
| 5,757,925 A | 5/1998 | Faybishenko | 709/203 |
| 5,758,328 A | 5/1998 | Giovannoli | 705/26 |
| 5,758,344 A | 5/1998 | Prasad et al. | 707/10 |
| 5,761,656 A | 6/1998 | Ben-Shachar | 707/4 |
| 5,764,897 A | 6/1998 | Khalidi | 709/201 |
| 5,768,532 A | 6/1998 | Megerian | 709/245 |
| 5,774,551 A | 6/1998 | Wu et al. | 713/155 |
| 5,774,729 A | 6/1998 | Carney et al. | 717/126 |
| 5,778,179 A | 7/1998 | Kanai et al. | 709/203 |
| 5,778,187 A | 7/1998 | Monteiro et al. | 709/231 |
| 5,778,228 A | 7/1998 | Wei | 709/328 |
| 5,778,368 A | 7/1998 | Hogan et al. | 707/10 |
| 5,784,560 A | 7/1998 | Kingdon et al. | 709/201 |
| 5,787,425 A | 7/1998 | Bigus | 707/6 |
| 5,787,431 A | 7/1998 | Shaughnessy | 707/100 |
| 5,790,548 A | 8/1998 | Sistanizadeh et al. | 370/401 |
| 5,790,677 A | 8/1998 | Fox et al. | 705/78 |
| 5,794,207 A | 8/1998 | Walker et al. | 705/1 |
| 5,802,367 A | 9/1998 | Held et al. | 709/332 |
| 5,805,805 A | 9/1998 | Civanlar et al. | 709/220 |
| 5,808,911 A | 9/1998 | Tucker et al. | 709/316 |
| 5,809,144 A | 9/1998 | Sirbu et al. | 705/53 |
| 5,809,507 A | 9/1998 | Cavanaugh, III | 707/103 R |
| 5,812,819 A | 9/1998 | Rodwin et al. | 703/23 |
| 5,813,013 A | 9/1998 | Shakib et al. | 707/102 |
| 5,815,149 A | 9/1998 | Mutschler, III et al. | 345/762 |
| 5,815,709 A | 9/1998 | Waldo et al. | 712/300 |
| 5,815,711 A | 9/1998 | Sakamoto et al. | 717/105 |
| 5,818,448 A | 10/1998 | Katiyar | 709/203 |
| 5,829,022 A | 10/1998 | Watanabe et al. | 711/118 |
| 5,832,219 A | 11/1998 | Pettus | 709/203 |
| 5,832,529 A * | 11/1998 | Wollrath et al. | 707/206 |
| 5,832,593 A | 11/1998 | Wurst et al. | 29/750 |
| 5,835,737 A | 11/1998 | Sand et al. | 710/113 |
| 5,842,018 A | 11/1998 | Atkinson et al. | 707/501.1 |
| 5,844,553 A | 12/1998 | Hao et al. | 345/733 |
| 5,845,090 A | 12/1998 | Collins, III et al. | 709/221 |
| 5,845,129 A | 12/1998 | Wendorf et al. | 710/200 |
| 5,850,442 A | 12/1998 | Muftic | 705/65 |
| 5,860,004 A | 1/1999 | Fowlow et al. | 717/109 |
| 5,860,153 A | 1/1999 | Matena et al. | 711/216 |
| 5,864,862 A | 1/1999 | Kriens et al. | 707/103 R |
| 5,864,866 A | 1/1999 | Henckel et al. | 707/103 R |
| 5,872,928 A | 2/1999 | Lewis et al. | 709/222 |
| 5,872,973 A | 2/1999 | Mitchell et al. | 709/332 |
| 5,875,335 A | 2/1999 | Beard | 717/139 |
| 5,878,411 A | 3/1999 | Borroughs et al. | 707/4 |
| 5,884,024 A | 3/1999 | Lim et al. | 713/201 |
| 5,884,079 A | 3/1999 | Furusawa | 717/109 |
| 5,887,134 A | 3/1999 | Ebrahim | 709/200 |
| 5,889,951 A | 3/1999 | Lombardi | 709/219 |
| 5,890,158 A | 3/1999 | House et al. | 707/10 |
| 5,892,904 A | 4/1999 | Atkinson et al. | 713/201 |
| 5,913,029 A | 6/1999 | Shostak | 709/203 |
| 5,933,497 A | 8/1999 | Beetcher et al. | 705/59 |
| 5,933,647 A | 8/1999 | Aronberg et al. | 717/178 |

| | | | |
|---|---|---|---|
| 5,935,249 A | 8/1999 | Stern et al. ................. 713/201 |
| 5,940,827 A | 8/1999 | Hapner et al. ................. 707/8 |
| 5,944,793 A | 8/1999 | Islam et al. ................. 709/220 |
| 5,946,485 A | 8/1999 | Weeren et al. ............. 717/109 |
| 5,946,694 A | 8/1999 | Copeland et al. ....... 707/103 R |
| 5,949,998 A | 9/1999 | Fowlow et al. ............. 717/105 |
| 5,951,652 A | 9/1999 | Ingrassia, Jr. et al. ...... 709/248 |
| 5,956,509 A | 9/1999 | Kevner ........................ 709/330 |
| 5,961,582 A | 10/1999 | Gaines ........................... 709/1 |
| 5,963,924 A | 10/1999 | Williams et al. .............. 705/40 |
| 5,963,947 A | 10/1999 | Ford et al. ..................... 707/10 |
| 5,966,531 A | 10/1999 | Skeen et al. ................. 709/315 |
| 5,969,967 A | 10/1999 | Aahlad et al. ................. 700/2 |
| 5,974,201 A | 10/1999 | Chang et al. ............... 382/305 |
| 5,978,484 A | 11/1999 | Apperson et al. ............ 705/54 |
| 5,982,773 A | 11/1999 | Nishimura et al. .... 370/395.53 |
| 5,987,506 A | 11/1999 | Carter et al. ................ 709/213 |
| 5,999,179 A | 12/1999 | Kekic et al. ................. 345/734 |
| 5,999,988 A | 12/1999 | Pelegri-Llopart et al. ... 709/330 |
| 6,003,050 A | 12/1999 | Silver et al. ................ 715/536 |
| 6,003,763 A | 12/1999 | Gallagher et al. .......... 235/379 |
| 6,009,103 A | 12/1999 | Woundy ...................... 370/401 |
| 6,009,413 A | 12/1999 | Webber et al. ................ 705/26 |
| 6,016,496 A | 1/2000 | Roberson ............... 707/103 R |
| 6,016,516 A | 1/2000 | Horikiri ....................... 709/330 |
| 6,023,586 A | 2/2000 | Gaisford et al. ............ 717/178 |
| 6,026,414 A | 2/2000 | Anglin ........................ 707/204 |
| 6,031,977 A | 2/2000 | Pettus ......................... 709/230 |
| 6,032,151 A | 2/2000 | Arnold et al. .......... 707/103 R |
| 6,044,381 A | 3/2000 | Boothby et al. ............ 707/201 |
| 6,052,761 A | 4/2000 | Hornung et al. ............ 711/141 |
| 6,058,383 A | 5/2000 | Narasimhalu et al. ........ 705/44 |
| 6,061,699 A | 5/2000 | DiCecco et al. ............ 707/513 |
| 6,061,713 A | 5/2000 | Bharadhwaj ................ 709/203 |
| 6,067,575 A | 5/2000 | McManis et al. ........... 709/313 |
| 6,085,255 A | 7/2000 | Vincent et al. ............. 709/238 |
| 6,093,216 A | 7/2000 | Adl-Tabatabai et al. .... 717/128 |
| 6,108,346 A | 8/2000 | Doucette et al. ............ 370/450 |
| 6,134,603 A | 10/2000 | Jones et al. ................. 709/330 |
| 6,182,083 B1 | 1/2001 | Scheifler et al. ......... 707/103 R |
| 6,185,602 B1 | 2/2001 | Bayrakeri ................... 709/204 |
| 6,185,611 B1 | 2/2001 | Waldo et al. ............... 709/221 |
| 6,199,116 B1 | 3/2001 | May et al. ................... 709/310 |
| 6,216,138 B1 | 4/2001 | Wells et al. ................. 707/502 |
| 6,216,158 B1 | 4/2001 | Luo et al. .................... 709/217 |
| 6,226,746 B1 | 5/2001 | Scheifler ..................... 713/200 |
| 6,243,716 B1 | 6/2001 | Waldo et al. ............... 707/202 |
| 6,247,091 B1 | 6/2001 | Lovett ........................ 710/260 |
| 6,253,256 B1 | 6/2001 | Wollrath et al. ............ 709/330 |
| 6,263,350 B1 * | 7/2001 | Wollrath et al. ............ 707/206 |
| 6,263,379 B1 | 7/2001 | Atkinson et al. ........... 709/332 |
| 6,272,559 B1 | 8/2001 | Jones et al. ................. 709/330 |
| 6,282,295 B1 | 8/2001 | Young et al. ................ 380/286 |
| 6,282,568 B1 | 8/2001 | Sondur et al. .............. 709/223 |
| 6,339,783 B1 | 1/2002 | Horikiri ....................... 709/203 |
| 6,343,308 B1 | 1/2002 | Marchesseault ................ 709/1 |
| 6,385,643 B1 | 5/2002 | Jacobs et al. ............... 709/203 |

FOREIGN PATENT DOCUMENTS

| | | |
|---|---|---|
| EP | 0 472 874 A1 | 3/1992 |
| EP | 0 474 340 A2 | 3/1992 |
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO92/09948 | 6/1992 |
| WO | WO93/25962 A1 | 12/1993 |
| WO | WO94/03855 | 2/1994 |
| WO | WO96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |

OTHER PUBLICATIONS

Cary G. Gray and David R. Cheriton, "Leases: An Efficient Fault–Tolerant Mechanism for Distributed File Cache Consistency", ACM, 1989, pp. 201–210.*

Jian Yin, Lorenzo Alvisi, Michael Dahlin, and Calvin Lin, "Using Leases to Support Server–Driven Consistency in Large–Scale Systems", IEEE, Distributed Computing Systems, Proceedings, 18th International Conference, 1998, pp. 1–10.*

Elliot Kolodner, Barbara Liskov, and William Weihl, "Atomic Garbage Collection: Managing a Stable Heap", ACM, 1989, pp. 15–25.*

Andrew Birrell, Greg Nelson, Susan Owicki, and Edward Wobber, "Network Objects", ACM, 1993, pp. 217–230.*

"Eden Project Proposal," Department of Computer Science, University of Washington, Oct. 1980, Technical Report #80–10–01, Cover and Foreword.

"Java (TM) Remote Method Invocation Specification," Sun Microsystems, Inc., <java.sun.com/products/jdk1.2beta1>, 1997.

"Transparent Network Computing," Locus Computing Corporation, Jan. 5, 1995.

Agha et al., "Actorspaces: An Open Distributed Programming Paradigm," University of Illinois, Report No. UIUCDCS–R–92–1766, Open Systems Laboratory TR No. 8, pp. 1–12, Nov. 1992.

Ahmed et al., "A Program Building Tool for Parallel Applications," Yale University, pp. 1–23, Dec. 1, 1993.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Alexander et al., "Active Bridging," Proceedings of the ACM/SIGCOMM'97 Cnference, Cannes, France, Sep. 1997.

Almes et al., "Edmans: A Locally Distributed Mail System," Department of Computer Science, University of Washington, Technical Report 83–07–01, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review," Department of Computer Science, University of Washington, Technical Report 83–01–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Anderson et al., "Persistent Linda: Linda + Transactions + Query Processing," Proceedings of the 13th Symposium on Fault Tolerant Systems, pp. 93–109, 1991.

Anonymous, "Change–Notification Service for Shared Files," IBM Technical Disclosure Bulletin, vol. 36, No. 8, pp. 77–82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Beech et al., "Object Databases as Generalizations of Relational Databases," Computer Standards & Interfaces, vol. 13, Nos. 1/3, pp. 221–230, Amsterdam, NL, Jan. 1991.

Begole et al., "Transparent Sharing of Java Applets: A Replicated Approach," Oct. 1997, pp. 55–65.

Bertino et al., "Object–Oriented Database Management Systems: Concepts and Issues," Computer, vol. 24, No. 4, pp. 33–47, Los Alamitos, CA, Apr. 1991.

Betz et al., "Interoperable Objects: Laying the Foundation for Distributed Object Computing," Dr. Dobb's Journal, vol. 1, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Distributed Garbage Collection for Network Objects," Digital Systems, Research Center, No. 116, pp. 1–18, Dec. 15, 1993.

Birrell et al., "Grapevine: An Exercise in Distributed Computing," Communications of the ACM, vol. 25, No. 4, pp. 260–274, Apr. 1982.

Birrell et al., "Implementing Remote Procedure Calls," ACM Transactions on Computer Systems, vol. 2, No. 1, pp. 39–59, Feb. 1984.

Birrell et al., "Network Objects," DEC SRC Research Report 115, Feb. 28, 1994.

Birrell et al., "Network Objects," Operating Systems Review, 27(5), pp. 217–230, Dec. 1993.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86–11–01, Nov. 1986, pp. 1–28.

Black, "Supporting Distributed Applications: Experience with Eden," Department of Computer Science, University of Washington, Technical Report 85–03–02, Mar. 1985, pp. 1–21.

Black, "The Eden Programming Language," Department of Computer Science, FR–35, University of Washington, Technical Report 85–09–01, Sep. 1985 (Revised Dec. 1985), pp. 1–19.

Black, "The Eden Project: Overview and Experiences," Department of Computer Science, University of Washington, EUUG, Autumn '86 Conference Proceedings, Manchester, UK, Sep. 22–25, 1986, pp. 177–189.

Braine et al., "Object–Flow," 1997, pp. 418–419.

Burns et al., "An Analytical Study of Opportunistic Lease Renewal," Distributed Computing Systems, 21st International Conference, pp. 146–153, Apr. 2000.

Cannon et al., "Adding Fault–Tolerant Transaction Processing to Linda," Software–Practice and Experience, vol. 24(5), pp. 449–466, May 1994.

Cardelli, "Obliq, A Lightweight Language For Network Objects," Digital SRC, pp. 1–37, Nov. 5, 1993.

Carriero et al., "Distributed Data Structures in Linda," Principles of Programming Language, pp. 1–16, 1986.

Carriero et al., "Distributed Data Structures in Linda," Yale Research Report YALEU/DCS/RR–438, Nov. 1985.

Chung et al., "A 'Tiny' Pascal Compiler: Part 1: The P–Code Interpreter," BYTE Publications, Inc., Sep. 1978.

Chung et al., "A 'Tiny' Pascal Compiler: Part 2: The P–Compiler," BYTE Publications, Inc., Oct. 1978.

Ciancarini et al., "Coordinating Distributed Applets with Shade/Java," Feb. 1998, pp. 130–138.

Coulouris et al., "Distributed Systems Concepts and Designs," Second Edition, Addison–Wesley, 1994.

Dave et al., "Proxies, Application Interface, And Distributed Systems," Proceedings International Workshop On Object Orientation In Operating Systems, pp. 212–220, Sep. 24, 1992.

Delcambre et al., "Simulation of the Object Flow Model: A Conceptual Modeling Language for Object–Drive Applications," 1993, pp. 216–225.

Deux et al., "The O2 System," Communications Of The Association For Computing Machinery, vol. 34, No. 10, pp. 34–48, Oct. 1, 1991.

Dijkstra, "Self–stabilizing Systems, in Spite of Distributed Control," Communications of the ACM, vol. 17, No. 11, pp. 643–644, Nov. 1974.

Dolev et al., "On the Minimal Synchronism Needed for Distributed Consensus," Journal of the ACM, vol. 34, No. 1, pp. 77–97, Jan. 1987.

Dollimore et al., "The Design of a System for Distributing Shared Objects," The Computer Journal, No. 6, Cambridge, GB, Dec. 1991.

Dourish, "A Divergence–Based Model of Synchrony and Distribution in Collaborative Systems," Xerox Technical Report EPC–1194–102, pp. 1–10, 1994.

Drexler et al., "Incentive Engineering for Computational Resource Management," The Ecology of Computation, Elsevier Science Publishers B.V., pp. 231–266, 1988.

Droms, "RFC 1541 Dynamic Host Configuration Protocol," <http://www.cis.ohio-state.edu/htbin/rfc/rfc1541.html>, pp. 1–33 Oct. 1993.

Emms "A Definition Of An Access Control Systems, Language," Computer Standards And Interfaces, vol. 6, No. 4, pp. 443–454, Jan. 1, 1987.

Fleisch et al., "High Performance Distributed Objects Using Distributed Shared Memory & Remote Method Invocation," System Sciences, 1998, Proceedings of the 31st Hawaii Internat'l. Conference, Jan. 6–9, 1998, pp. 574–578.

Gelernter et al., "Parallel Programming in Linda," Yale University, pp. 1–21, Jan. 1985.

Gelernter, "Generative Communication in Linda," ACM Transactions On Programming Languages and Systems, vol. 7 No. 1, pp. 80–112, Jan. 1985.

Goldberg et al., "Smalltalk–80—The Language and its Implementation," Xerox Palo Alto Research Center, 1983 (reprinted with corrections, Jul 1985), pp. 1–720.

Gosling et al., "The Java (TM) Language Specification," Addison–Wesley, 1996.

Gottlob et al., "Extending Object–Oriented Systems, with Roles," ACM Transactions On Information Systems, vol. 14, No. 3, pp. 268–296, Jul. 1996.

Gray et al., "Leases: An Efficient Fault–Tolerant Mechanism for Distributed File Cache Consistency," ACM, pp. 202–210, 1989.

Guth, "JavaOne: Sun to Expand Java Distributed Computing Effort," <http://www.sunworld.com/swol-02-1998/swol-02-sunspots.html>, XP-002109935, P. 1, Feb. 20, 1998.

Guyennet et al., "A New Consistency Protocol Implemented in the CAliF System," IEEE, 1094-7256/97, pp. 82–87, 1997.

Guyennet et al., "Distributed Shared Memory Layer for Cooperative Work Applications," IEEE, 0742-1303/97, pp. 72–78, 1997.

Hamilton et al., "Subcontract: A Flexible Base For Distributed Programming," Proceedings of 14th Symposium of Operating System Principles, Dec. 1993.

Hamilton, "Java and the Shift to Net–Centric Computing," Computers, pp. 31–39, Aug. 1996.

Harris et al., "Proposal for a General Java Proxy Class for Distributed Systems, and Other Uses," Netscape Communications Corp., Jun. 25, 1997.

Hartman et al., "Liquid Software: A New Paradigm For Networked Systems," Technical Report 96–11, Department of Comp. Sci., Univ. of Arizona, Jun. 1996.

Hodges, Douglas, "Managing Object Lifetimes in OLE," Aug. 25, 1994, pp. 1–41.

Holman et al., "The Eden Shared Calendar System," Department of Computer Science, FR–35, University of Washington, Technical Report 85–05–02, Jun. 22, 1985, pp. 1–14.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

Howard et al., "Scale and Performance in a Distributed File System," ACM Transactions on Computer Systems, vol. 6, No. 1, pp. 51–81, Feb. 1988.

Hsu, "Reimplementing Remote Procedure Calls," University of Washington, Thesis, Mar. 22, 1985, pp. 1–106.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

Hutchinson, "Emerald: An Object–Based Language for Distributed Programming," a Dissertation, University of Washington, 1987, pp. 1–107.

IBM (TM) Technical Disclosure Bulletin, "Object Location Algorithm," vol. 36, No. 09B, pp. 257–258, Sep. 1993.

IBM (TM) Technical Dislcosure Bulletin, "Retrieval of Qualified Variables Using Extendible Hashing," vol. 36, No. 12, pp. 301–303, Dec. 1993.

IBM (TM) Technical Dislcosure Bulletin, "Local Network Monitoring to Populate Access Agent Directory," vol. 36, No. 09A, pp. 403–405, Sep. 1993.

IBM, "Chapter 6—Distributed SOM (DSOM)," SOMobjects Developer Toolkit Users Guide, Version 2.1, pp. 6-1-6-90, Oct. 1994.

Jaworksi, "Java 1.1 Developer's Guide, 2nd Edition," Sams.net, 1997.

Jones et al., "Garbage Collection: Algorithms for Automatic Dynamic Memory Management," pp. 165–175, John Wiley & Sons, 1996.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 (1 page Vita).

Kambhatla et al., "Recovery with Limited Replay: Fault-Tolerant Processes in Linda," Oregon Graduate Institute, Technical Report CSIE 90–019, pp. 1–16, Sep. 1990.

Kay et al., "An Overview of the Raleigh Object–Oriented Database System," ICL Technical Journal, vol. 7, No. 4, pp. 780–798, Oxford, GB, Nov. 1991.

Koshizuka et al., "Window Real–Objects: A Distributed Shared Memory for Distributed Implementation of GUI Applications," Nov. 1993, pp. 237–247.

Kougiouris et al., "Support for Space Efficient Object Invocation in Spring," Sep. 1994.

Krasner et al., "Smalltalk–80: Bits of History, Words of Advice," 1983, Xerox Corporation, pp. 1–344.

Krasner, "The Smalltalk–80 Virtual Machine," BYTE Publications Inc., pp. 300–320, Aug. 1991.

Lamport et al., "The Byzantine Generals Problem," ACM Transactions on Programming Languages and Systems, vol. 4, No. 3, pp. 382–401, Jul. 1982.

Lavana et al., "Executable Workflows: A Paradigm for Collaborative Design on the Internet," Jun. 1997, 6 pages.

Linda Database Search, pp. 1–68, Jul. 20, 1995.

Lindholm et al., "The Java (TM) Virtual Machine Specification," Addison Wesley, 1996.

Liskov et al., "Distributed Object Managment in Thor," International Workshop on Distributed Object Management, p. 12, 1992.

McDaniel, "An Analysis of a Mesa Instruction Set," Xerox Corporation, May 1982.

McGrath, "Discovery and Its Discontents: Discovery Protocols for Ubiquitous Computing," Presented at Center for Excellence in Space Data and Information Science NASA Goddard Space Flight Center, Apr. 5, 2000.

Mitchell et al., "An Overview of the Spring System," Feb. 1994.

Mitchell et al., "Mesa Language Manual," Xerox Corporation, Palo Alto Research Center, 1978.

Mullender, "Distributed Systems," Second Edition, Addison–Wesley, 1993.

Mummert et al., "Long Term Distributed File Reference Tracing: Implementation and Experience," Carnegie Mellon University School of Computer Science, pp. 1–28, Nov. 1994.

MUX–Elektronik, Java 1.1 Interactive Course, www.lls.se/mux/javaic.html, 1995.

Orfali et al., "The Essential Distributed Objects Survival Guide," Chapter 11: Corba Commercial ORBs, pp. 203–215, John Wiley & Sons, Inc., 1996.

Ousterhout et al., "The Sprite Network Operating System," Computer, IEEE, pp. 23–36, Feb. 1988.

Pier, "A Retrospective on the Dorando, A High–Performance Personal Computer," IEEE Conference Proceedings, The 10th Annual International Symposium on Computer Architecture, 1983.

Pier, "A Retrospective on the Dorando, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Proceedings of the Eighth Symposium on Operating Systems, Principles, Dec. 14–16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Riggs et al., "Picking State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Sharrott et al., "ObjectMap: Integrating High Performance Resources into a Distributed Object–oriented Environment," ICODP, 1995.

Stevenson, "Token–Based Consistency of Replicated Servers," IEEE, CH2686–4/89/0000/0179, pp. 179–183, 1989.

Thompson, "Regular Expression Search Algorithm," Communications of the ACM, vol. II, No. 6, p. 149 et seq., Jun. 1968.

Trehan et al., "Toolkit for Shared Hypermedia on a Distributed Object Oriented Architecture," 1993, pp. 1–8.

Venners, "Jini Technology Out of the Box," JAVAWORLD, 'Online!, pp. 1–4, Dec. 1998.

Waldo et al., "Events In An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Wilson et al., "Design of the Opportunistic Garbage Collector," Proceedings of the Object Oriented Programming Systems, Languages And Applications Conference, New Orleans, vol. 24, No. 10, Oct. 1989.

Wollrath et al., "A Distributed Object Model for the Java (TM) System," USENIX Association, Conference on Object–Oriented Technologies and Systems, Jun. 17–21, 1996.

Wu, "A Type System For An Object–Oriented Database System," Proceedings of the International Computer Software and Applications Conference (COMPSAC), Tokyo, Japan, pp. 333–338, Sep. 11–13, 1991.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large–Scale Systems," Computer Services Department, University of Texas at Austin, p. 285–294, May 26–28, 1998.

Yin et al., "Volume Leases for Consistency in Large–Scale Systems," IEEE Transactions on Knowledge & Data Engineering, vol. 11, No. 4, pp. 563–576, Jul./Aug. 1999.

Droms, R., "Dynamic Host Configuration Protocol," Oct. 1993, pp. 1–37.

"Consumers Can View, Share Picture On–Line as Kodak Picture Network Goes 'Live'," Business Wire, Aug. 25, 1997, pp. 18–19.

"ISN Dataweb Sells Software, Hardware," Datamation, Apr. 1, 1996, p. 40.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Network Sends Prints Home from the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Webwatch: MCI Announces Internet Access,", Boardwatch Magazine, Jan. 1995.

Administrator's Guide, Netscape Enterprise Server, Version 3.0, Netscape Communications Corp., 1998.

Bandrowski, "Stores Without Doors: Kiosks Generate New Profits," Corporate Computing, Oct. 1992, pp. 193–195.

Bruno, "Working the Web," Data Communications, Apr. 1997, pp. 50–60.

Cohen, "Electronic Commerce," USC/Information Sciences Institute, Oct. 1989.

Conhaim, "Online shopping: a beginner's guide; includes related listing of videotex services," Link–Up, vol. 5, No. 6, p. 32, Nov. 1988.

Design Project #2, Electronic Shopping at MIT, MIT Class 6.033 Handout 23, Massachusetts Institute of Tecnology, http://web.mit.edu/6.033/1995/handouts/html/h23.html, Spring 1995, pp. 1–6.

Ellsworth, "Boom Town," Internet World, Jun. 1995, pp. 33–35.

Estrin, "Inter–Organization Networks: Implications of Access Control Requirements for Interconnection Protocols," ACM, 1986, pp. 254–263.

Fleischer, "SkyMall's 'Supplier Network' Takes Flight", Retailtech, The Technology Magazine for Retail Executives, Apr. 1997.

Foley, "Managing Campus–Wide Information Systems: Issues and Problems," Capitalizing on Communication, ACM SIGUCCS XVII, 1989, pp. 169–174.

Fryxell, "eaasySABRE," Link–Up, May/Jun. 1996, pp. 10–11.

Gardner, "Kodak Follows Startup Into Online Photo Processing Business," Internet World, Sep. 8, 1997, pp. 5–6.

Gogan et al., "Open Market, Inc.: Managing in a Turbulent Environment," Harvard Business School Publishing, Aug. 29, 1996, pp. 1–30.

Israel et al., "Authentication in Office System Internetworks," ACM Transactions on Office Information Systems, vol. 1, No. 3, Jul. 1983, pp. 193–210.

Keller, "Smart Catalogs and Virtual Catalogs," Proceedings of the First USENIX Workshop of Electronic Commerce, USENIX Association, Jul. 11–12, 1995, pp. 125–131.

Klein et al., "TRADE'ex: The Stock Exchange of the Computer Industry," Harvard Business School Publishing, 1996, pp. 1–14.

Kodak Photonet FAQ, PhotoNet Online, Jun. 14, 2002, pp. 1–3.

Kramer, "NETWATCH; The AJC's Daily Online Guide; Get the picture: Kodak will send photos to Web," The Atlanta Journal and Constitution, Sec. Features, pg. 08C, Jun. 5, 1997.

Lampson et al., "Authentication in Distributed Systems: Theory and Practice," ACM Transactions n Computer Systems, vol. 10, No. 4, Nov. 1992, pp. 265–310.

Lansky, "Without APS, Photo Life Goes on Via Internet," Photographic Trade News, Aug. 1996, pp. 19–23.

Lewis, "Pacific Bell, MCI to Expand Internet Service," The New York Times, sec. D, col. 1 at 3, Mar. 28, 1995.

LightSurf Instant Imaging—Press Releases, "Kodak And LightSurf Collaborate On Kodak Picture Center Online," LifeSurf Technologies Inc., Jun. 14, 2002, pp. 1–3.

Louwerse et al., "Data Protection Aspects in an Integrated Hospital Information System," North–Holland Computers & Security 3, 1984, pp. 286–294.

McEnaney, "Point–and–Click Memory Sharing; Launches PhotoNet online digital photography and imaging services," Photographic Trade News, Sec. Pg. 23, Jan. 1997.

Miller, "Web posting as a photo processing option," USA Today, Section: Life, pg. 17D, Dec. 13, 1996.

Morris et al., "Andrew: A Distributed Personal Computing Environment," Communications of the ACM, vol. 29, No. 3, Mar. 1986, pp. 184–201.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Petersen, "New But Not Improved," Direct Magazine, Nov. 1995.

Press Release, "Sun Goes Live With The Kodak Picture Network," Sun Microsystems, Inc., Jun. 14, 2002, pp. 1–2.

Raeder, "Is there a Prodigy in your future?," Database Searcher, vol. 5, No. 6, pg. 18, Jun. 1989.

Ramm et al., "Exu—A System for Secure Delegation of Authority on an Insecure Network," Ninth System Administration Conference, 1995 LISA IX, Sep. 17–22, 1995, pp. 89–93.

Satyanarayanan, "Integrating Security in a Large Distributed System," ACM Transactions on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems, Management, Summer 1996, pp. 15–24.

Steinke, "Design Aspects of Access Control in a Knowledge Base System," Computers & Security, 10, 1991, pp. 612–625.

Stern, "Industry Net," Link–Up, Mar./Apr. 1995, p. 10.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network— Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Welz, "New Deals: A ripening Internet market, secure systems, and digital currency are reshaping global commerce," Internet World, Jun. 1995, pp. 36–41.

Wobber et al., "Authentication in the Taos Operating System," ACM, 1993, pp. 256–269.

Wyatt, "Netscape Enterprise Server," Prima Publishing, 1996.

Kolodner et al., "Atomic Garbage Collection; Managing a Stable Heap," ACM, 1989, pp. 15–25.

Osborn, "The Role of Polymorphism in Schema Evolution in an Object–Oriented Database," IEEE Transactiosn on Knowledge and Data Engineering, vol. 1, No. 3, Sep. 1989, pp. 310–317.

Kon, Fabio "Distributed File Systems Past, Present and Future A distributed File system for 2006," Mar. 6, 1996, pp. 1–12.

Osboron, "The Role of Polymorphism in Schema Evolution in an Object–Oriented Database," IEEE Transactions on Knowledge and Data Engineering, vol. 1, No. 3, Sep. 1989, pp. 310–317.

* cited by examiner

METHOD AND SYSTEM FOR LEASING STORAGE

RELATED APPLICATIONS

This is a continuation of U.S. patent application Ser. No. 09/690,472, U.S. Pat. No. 6,519,615 B1filed Oct. 18, 2000, which is a continuation of U.S. patent application Ser. No. 09/044,923, filed Mar. 20, 1998, now U.S. Pat. No. 6,263, 350, which is a continuation-in-part of U.S. patent application Ser. No., 08/729,421, filed on Oct. 11, 1996, now U.S. Pat. No. 5,832,529, all of which are incorporated herein by reference.

The following identified U.S. patent applications are relied upon and are incorporated by reference in this application.

Provisional U.S. Application No. 60/076,048, entitled "Distributed Computing System," filed on Feb. 26, 1998.

U.S. patent application Ser. No. 09/044,838, entitled "Method, Apparatus, and Product for Leasing of Delegation Certificates in a Distributed System," now U.S. Pat. No. 6,247,026, and filed on Mar. 20, 1998, which is a continuation-in-part of U.S. application Ser. No. 08/729, 421, filed on Oct. 11, 1996, now U.S. Pat. No. 5,832,529.

U.S. patent application Ser. No. 09/044,834, entitled "Method, Apparatus and Product for Leasing of Group Membership in a Distributed System," and filed on Mar. 20, 1998, which is a continuation-in-part of U.S. patent application Ser. No. 08/729,421, filed Oct. 11, 1996, now U.S. Pat. No. 5,832,529.

U.S. patent application Ser. No. 09/044,926, entitled "Leasing for Failure Detection," and filed on Mar. 20, 1998, now U.S. Pat. No. 6,016,500, which is a continuation-in-part of U.S. patent application Ser. No. 08/729,421, filed Oct. 11, 1996, now U.S. Pat. No. 5,832,529.

U.S. patent application Ser. No. 09/044,933, entitled "Method for Transporting Behavior in Event Based System," and filed on Mar. 20, 1998.

U.S. patent application Ser. No. 09/044,919, entitled "Deferred Reconstruction of Objects and Remote Loading for Event Notification in a Distributed System," filed on Mar. 20, 1998, and now U.S. Pat. No. 6,272,559.

U.S. patent application Ser. No. 09/044,938, entitled "Methods and Apparatus for Remote Method Invocation," and filed on Mar. 20, 1998.

U.S. patent application Ser. No. 09/045,652, entitled "Method and System for Deterministic Hashes to Identify Remote Methods," filed on Mar. 20, 1998, and now U.S. Pat. No. 6,134,603.

U.S. patent application Ser. No. 09/044,790, entitled "Method and Apparatus for Determining Status of Remote Objects in a Distributed System," and filed on Mar. 20, 1998.

U.S. patent application Ser. No. 09/044,930, entitled "Downloadable Smart Proxies for Performing Processing Associated with a Remote Procedure Call in a Distributed System," and filed on Mar. 20, 1998.

U.S. patent application Ser. No. 09/044,917, entitled "Suspension and Continuation of Remote Methods," filed on Mar. 20, 1998, and now U.S. Pat. No. 6,237,024.

U.S. patent application Ser. No. 09/044,835, entitled "Method and System for Multi-Entry and Multi-Template Matching in a Database," filed on Mar. 20, 1998, and now U.S. Pat. No. 6,182,083.

U.S. patent application Ser. No. 09/044,839, entitled "Method and System for In-Place Modifications in a Database," and filed on Mar. 20, 1998.

U.S. patent application Ser. No. 09/044,945, entitled "Method and System for Typesafe Attribute Matching in a Database," and filed on Mar. 20, 1998.

U.S. patent application Ser. No. 09/044,931, entitled "Dynamic Lookup Service in a Distributed System," filed on Mar. 20, 1998, and now U.S. Pat. No. 6,185,611.

U.S. patent application Ser. No. 09/044,939, entitled "Apparatus and Method for Providing Downloadable Code for Use in Communicating with a Device in a Distributed System," and filed on Mar. 20, 1998.

U.S. patent application Ser. No. 09/044,826, entitled "Method and System for Facilitating Access to a Lookup Service," and filed on Mar. 20, 1998.

U.S. patent application Ser. No. 09/044,932, entitled "Apparatus and Method for Dynamically Verifying Information in a Distributed System," and filed on Mar. 20, 1998.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on Mar. 20, 1998.

U.S. patent application Ser. No. 09/044,934, entitled "Polymorphic Token-Based Control," and filed on Mar. 20, 1998.

U.S. patent application Ser. No. 09/044,915, entitled "Stack-Based Access Control," filed on Mar. 20, 1998, and now U.S. Pat. No. 6,138,238.

U.S. patent application Ser. No. 09/044,944, entitled "Stack-Based Security Requirements," filed on Mar. 20, 1998, and now U.S. Pat. No. 6,226,746.

U.S. patent application Ser. No. 09/044,837, entitled "Per-Method Designation of Security Requirements," filed on Mar. 20, 1998, and now U.S. Pat. No. 6,282,652.

BACKGROUND OF THE INVENTION

A. Field of the Invention

This invention generally relates to data processing systems and, more particularly, to leasing storage in data processing systems.

B. Description of the Related Art

Proper resource management is an important aspect to efficient and effective use of computers. In general, resource management involves allocating resources (e.g., memory) in response to requests as well as deallocating resources at appropriate times, for example, when the requesters no longer require the resources. In general, the resources contain data referenced by computational entities (e.g., applications, programs, applets, etc.) executing in the computers.

In practice, when applications executing on computers seek to refer to resources, the computers must first allocate or designate resources so that the applications can properly refer to them. When the applications no longer refer to a resource, the computers can deallocate or reclaim the resource for reuse. In computers each resource has a unique "handle" by which the resource can be referenced. The handle may be implemented in various ways, such as an address, array index, unique value, pointer, etc.

Resource management is relatively simple for a single computer because the events indicating when resources can be reclaimed, such as when applications no longer refer to them or after a power failure, are easy to determine. Resource management for distributed systems connecting multiple computers is more difficult because applications in several different computers may be using the same resource.

Disconnects in distributed systems can lead to the improper and premature reclamation of resources or to the failure to reclaim resources. For example, multiple applications operating on different computers in a distributed system may refer to resources located on other machines. If connections between the computers on which resources are located and the applications referring to those resources are interrupted, then the computers may reclaim the resources prematurely. Alternatively, the computers may maintain the resources in perpetuity, despite the extended period of time that applications failed to access the resources.

These difficulties have led to the development of systems to manage network resources, one of which is known as "distributed garbage collection." That term describes a facility provided by a language or runtime system for distributed systems that automatically manages resources used by an application or group of applications running on different computers in a network.

In general, garbage collection uses the notion that resources can be freed for future use when they are no longer referenced by any part of an application. Distributed garbage collection extends this notion to the realm of distributed computing, reclaiming resources when no application on any computer refers to them.

Distributed garbage collection must maintain integrity between allocated resources and the references to those resources. In other words, the system must not be permitted to deallocate or free a resource when an application running on any computer in the network continues to refer to that resource. This reference-to-resource binding, referred to as "referential integrity," does not guarantee that the reference will always grant access to the resource to which it refers. For example, network failures can make such access impossible. The integrity, however, guarantees that if the reference can be used to gain access to any resource, it will be the same resource to which the reference was first given.

Distributed systems using garbage collection must also reclaim resources no longer being referenced at some time in the finite future. In other words, the system must provide a guarantee against "memory leaks." A memory leak can occur when all applications drop references to a resource, but the system fails to reclaim the resource for reuse because, for example, of an incorrect determination that some application still refers to the resource.

Referential integrity failures and memory leaks often result from disconnections between applications referencing the resources and the garbage collection system managing the allocation and deallocation of those resources. For example, a disconnection in a network connection between an application referring to a resource and a garbage collection system managing that resource may prevent the garbage collection system from determining whether and when to reclaim the resource. Alternatively, the garbage collection system might mistakenly determine that, since an application has not accessed a resource within a predetermined time, it may collect that resource. A number of techniques have been used to improve the distributed garbage collection mechanism by attempting to ensure that such mechanisms maintain referential integrity without memory leaks. One conventional approach uses a form of reference counting, in which a count is maintained of the number of applications referring to each resource. When a resource's count goes to zero, the garbage collection system may reclaim the resource. Such a reference counting scheme only works, however, if the resource is created with a corresponding reference counter. The garbage collection system in this case increments the resource's reference count as additional applications refer to the resource, and decrements the count when an application no longer refers to the resource.

Reference counting schemes, however, especially encounter problems in the face of failures that can occur in distributed systems. Such failures can take the form of a computer or application failure or network failure that prevent the delivery of messages notifying the garbage collection system that a resource is no longer being referenced. If messages go undelivered because of a network disconnect, the garbage collection system does not know when to reclaim the resource.

To prevent such failures, some conventional reference counting schemes include "keep-alive" messages, which are also referred to as "ping back." According to this scheme, applications in the network send messages to the garbage collection system overseeing resources and indicate that the applications can still communicate. These messages prevent the garbage collection system from dropping references to resources. Failure to receive such a "keep-alive" message indicates that the garbage collection system can decrement the reference count for a resource and, thus, when the count reaches zero, the garbage collection system may reclaim the resource. This, however, can still result in the premature reclamation of resources following reference counts reaching zero from a failure to receive "keep-alive" messages because of network failures. This violates the referential integrity requirement.

Another proposed method for resolving referential integrity problems in garbage collection systems is to maintain not only a reference count but also an identifier corresponding to each computational entity referring to a resource. See A. Birrell, et al., "Distributed Garbage Collection for Network Objects," No. 116, digital Systems Research Center, Dec. 15, 1993. This method suffers from the same problems as the reference counting schemes. Further, this method requires the addition of unique identifiers for each computational entity referring to each resource, adding overhead that would unnecessarily increase communication within distributed systems and add storage requirements (i.e., the list of identifiers corresponding to applications referring to each resource).

SUMMARY OF THE INVENTION

In accordance with the present invention, referential integrity is guaranteed without costly memory leaks by leasing resources for a period of time during which the parties in a distributed system, for example, an application holding a reference to a resource and the garbage collection system managing that resource, agree that the resource and a reference to that resource will be guaranteed. At the end of the lease period, the guarantee that the reference to the resource will continue lapses, allowing the garbage collection system to reclaim the resource. Because the application holding the reference to the resource and the garbage collection system managing the resource agree to a finite guaranteed lease period, both can know when the lease and, therefore, the guarantee, expires. This guarantees referential integrity for the duration of a reference lease and avoids the concern of failing to free the resource because of network errors. In addition to memory, the leasing technique can be applied to other types of storage, such as storage devices.

Consistent with an alternative embodiment of the present invention, as embodied and broadly described herein, a method for leasing storage locations is provided. This method comprises the steps of receiving a request from a caller specifying a storage location and a lease period, determining a lease period during which the caller has access to the specified storage locations, advising the caller of the granted lease period, and permitting the caller to access storage locations for the determined lease period.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. Wherever possible, the same reference numbers will be used throughout the drawings and the following description to refer to the same or like parts.

The present invention may be implemented by computers organized in a conventional distributed processing system architecture. The architecture for and procedures to implement this invention, however, are not conventional, because they provide a distributed garbage collection scheme that ensures referential integrity and eliminates memory leaks.

A. Overview

A method invocation (MI) component located in each of the computers in the distributed processing system implements the distributed garbage collection scheme of this invention. The MI component may consist of a number of software modules preferably written in the JAVA™ programming language.

In general, whenever an application in the distributed processing system obtains a reference to a distributed resource, by a name lookup, as a return value to some other call, or another method, and seeks to access the resource, the application makes a call to the resource or to an MI component managing the resource. That MI component, called a managing MI component, keeps track of the number of outstanding references to the resource. When the number of references to a reference is zero, the managing MI component can reclaim the resource. The count of the number of references to a resource is generally called the "reference count" and the call that increments the reference count may be referred to as a "dirty call."

When an application no longer requires a distributed resource, it sends a different call to the resource or the managing MI component. Upon receipt of this call, the managing MI component decrements the reference count for the resource. This call to drop a reference may be referred to as a "clean call."

In accordance with an implementation of the present invention, a dirty call can include a requested time interval, called a lease period, for the reference to the resource. Upon receipt of the dirty call, the managing MI component sends a return call indicating a period for which the lease was granted. The managing MI component thus tracks the lease period for those references as well as the number of outstanding references. Consequently, when the reference count for a resource goes to zero or when the lease period for the resource expires, the managing MI component can reclaim the resource.

B. Procedure

Figure 1:
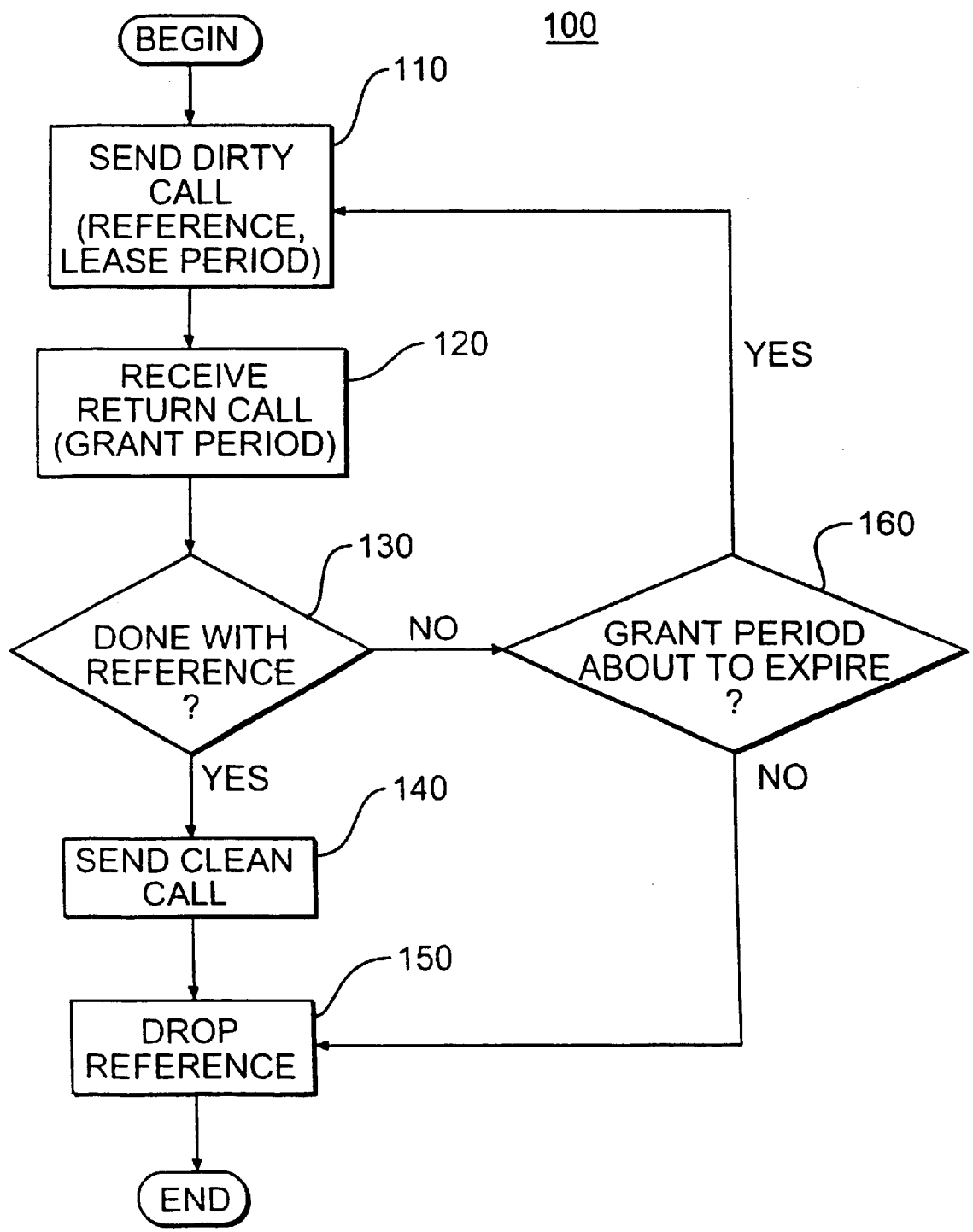
FIG. 1 is a flow diagram of the steps performed by the application call processor according to an implementation of the present invention.

An application call processor in an MI component performs the steps of the application call procedure 100 illustrated in FIG. 1. The server call processor in the managing MI component performs the steps of the procedures 200, 300, and 400 illustrated in FIGS. 2–4, respectively. The managing MI component's garbage collector performs conventional procedures to reclaim resources previously bound to references in accordance with instructions from the server call processor. Accordingly, the conventional procedures of the garbage collector will not be explained.

1. Application Call Processor

FIG. 1 is a flow diagram of the procedure 100 that the application call processor of the MI component uses to handle application requests for references to resources managed by the same or another MI component located in the distributed processing system.

After an application has obtained a reference to a resource, the application call processor sends a dirty call, including the resource's reference and a requested lease period to the managing MI component for the resource (step 110). The dirty call may be directed to the resource itself or to the managing MI component.

The application call processor then waits for and receives a return call from the managing MI component (step 120). The return call includes a granted lease period during which the managing MI component guarantees that the reference of the dirty call will be bound to its resource. In other words, the managing MI component agrees not to collect the resource corresponding to the reference of a dirty call for the grant period. If the managing MI component does not provide a grant period, or rejects the request for a lease, then the application call processor will have to send another dirty call until it receives a grant period.

The application call processor monitors the application's use of the reference and, either when the application explicitly informs the application call processor that the reference is no longer required or when the application call processor makes this determination on its own (step 130), the application call processor sends a clean call to the managing MI component (step 140). In a manner similar to the method used for dirty calls, the clean call may be directed to the referenced resource and the managing MI component will process the clean call. Subsequently, the application call processor eliminates the reference from a list of references being used by the application (step 150).

If the application is not yet done with the reference (step 130), but the application call processor determines that the grant period for the reference is about to expire (step 160), then the application call processor repeats steps 110 and 120 to ensure that the reference to the resource is maintained by the managing MI component on behalf of the application.

2. Server Call Processor

The MI component's server call processor performs three main procedures: (1) handling dirty calls; (2) handling incoming clean calls; and (3) initiating a garbage collection cycle to reclaim resources at the appropriate time.

(I) Dirty Calls

Figure 2:
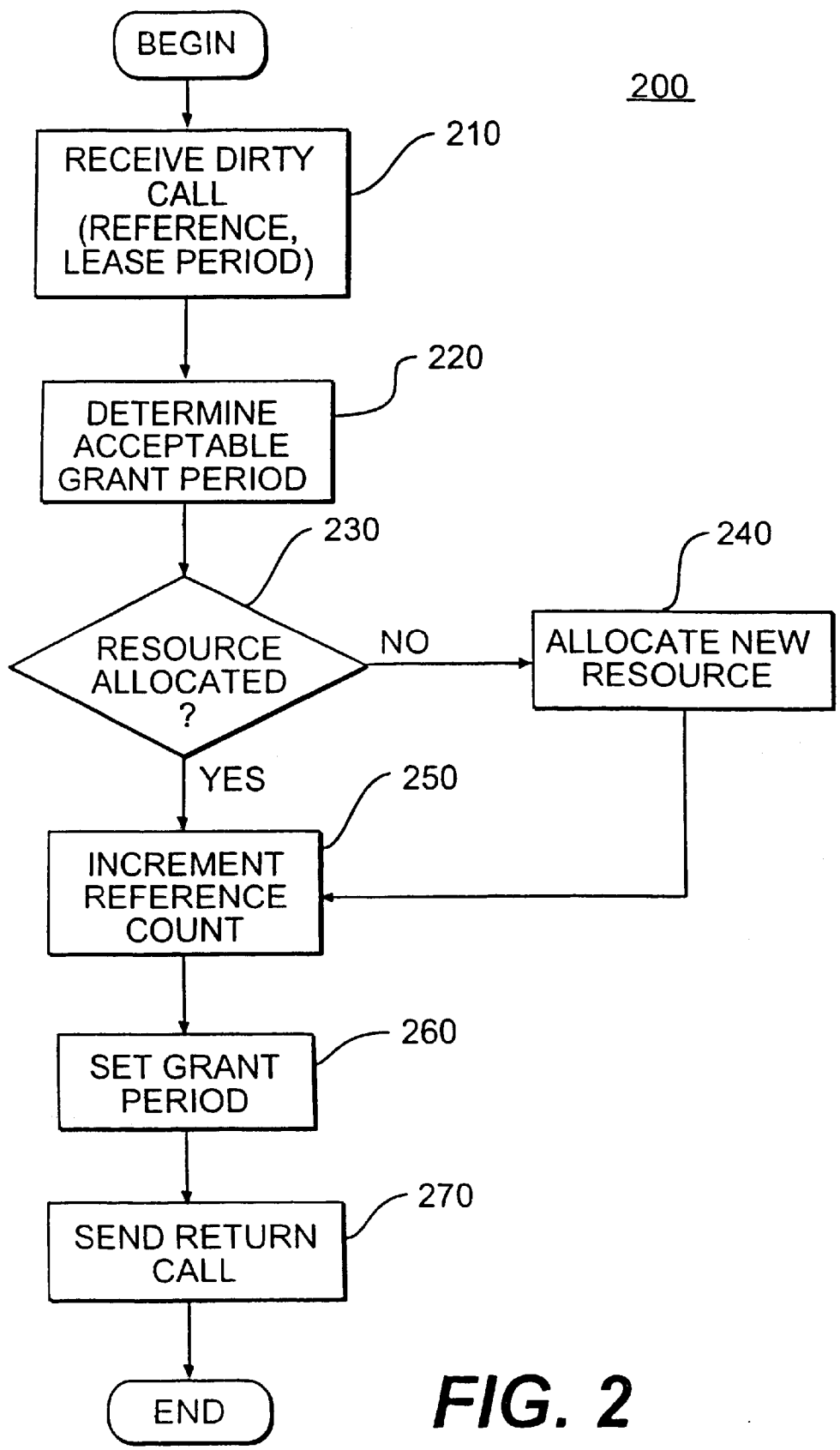
FIG. 2 is a flow diagram of the steps performed by the server call processor to process dirty calls according to the implementation of the present invention.

FIG. 2 is a flow diagram of the procedure 200 that the MI component's server call processor uses to handle requests to reference resources, i.e., dirty calls, that the MI software component manages. These requests come from application call processors of MI components in the distributed processing system, including the application call processor of the same MI component as the server call processor handling requests.

First, the server call processor receives a dirty call (step 210). The server call processor then determines an acceptable grant period (step 220). The grant period may be the same as the requested lease period or some other time period. The server call processor determines the appropriate grant period based on a number of conditions including the amount of resource required and the number of other grant periods previously granted for the same resource.

When the server call processor determines that a resource has not yet been allocated for the reference of a dirty call (step 230), the server call processor allocates the required resource (step 240).

The server call processor then increments a reference count corresponding to the reference of a dirty call (step 250), sets the acceptable grant period for the reference-to-resource binding (step 260), and sends a return call to an application call processor with the grant period (step 270). In this way, the server call processor controls incoming dirty calls regarding references to resources under its control.

Applications can extend leases by sending dirty calls with an extension request before current leases expire. As shown in procedure 200, a request to extend a lease is treated just like an initial request for a lease. An extension simply means that the resource will not be reclaimed for some additional interval of time, unless the reference count goes to zero.

(ii) Clean Calls

Figure 3:
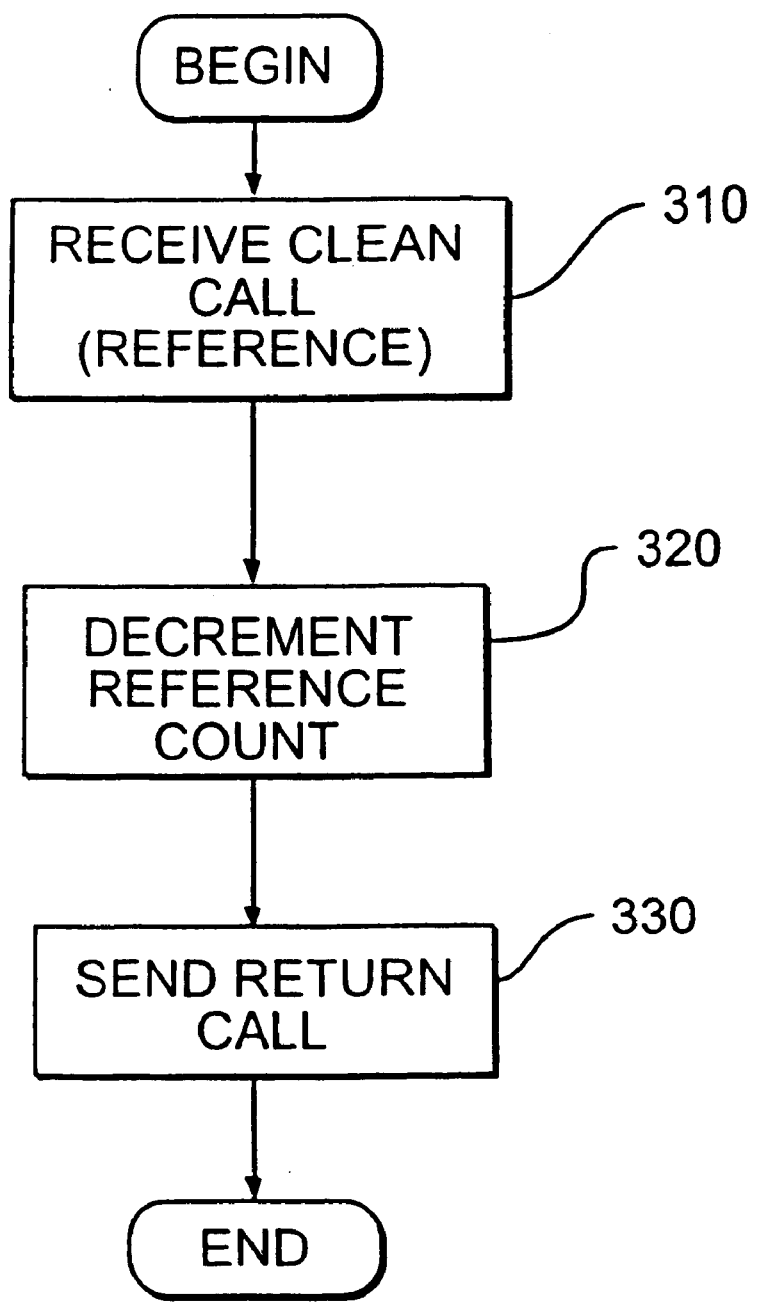
FIG. 3 is a flow diagram of the steps performed by the server call processor to process clean calls according to the implementation of the present invention.
Figure 4:
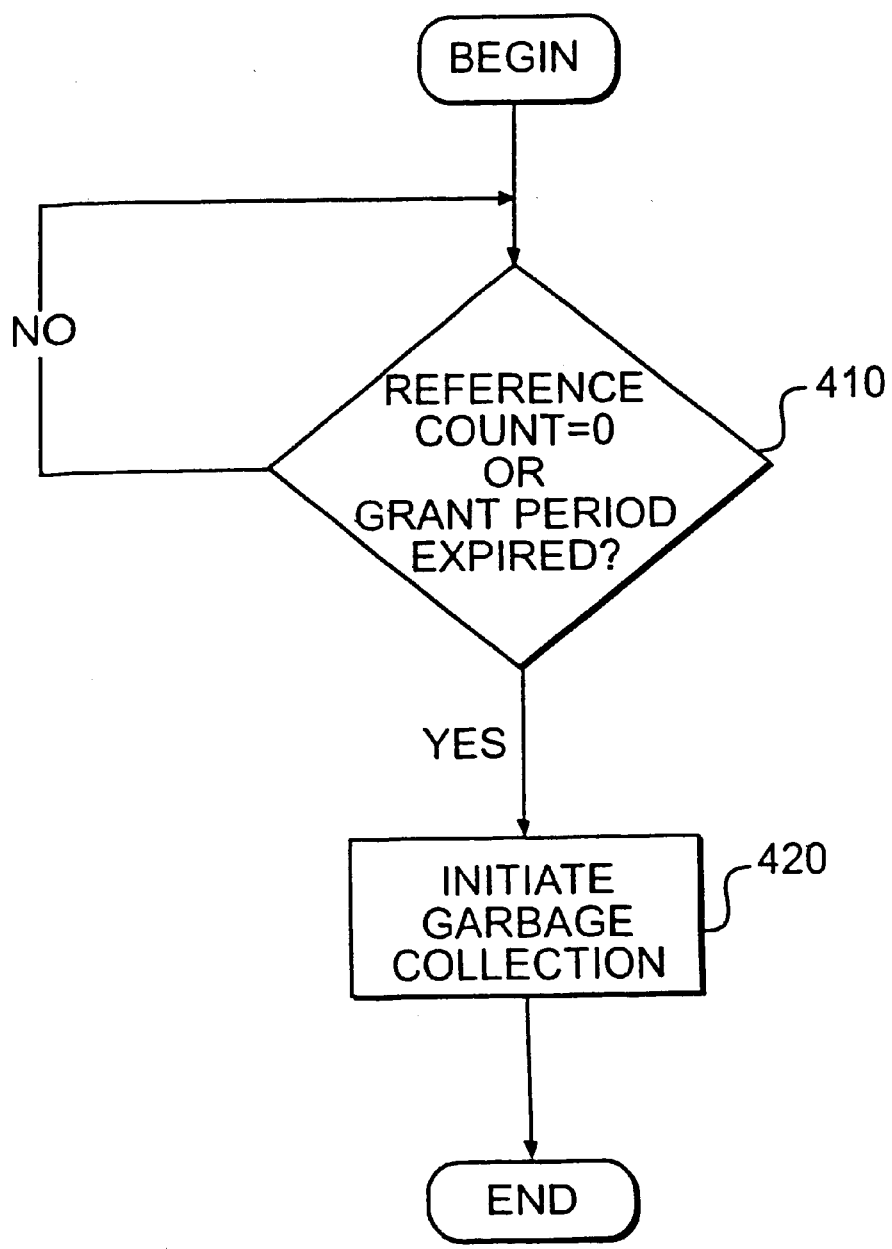
FIG. 4 is a flow diagram of the steps performed by the server call processor to initiate a garbage collection process according to the implementation of the present invention.

The MI component's server call processor also handles incoming clean calls from application call processors. When an application in the distributed processing system no longer requires a reference to a resource, it informs the MI component managing the resource for that reference so that the resource may be reclaimed for reuse. FIG. 3 is a flow diagram of the procedure 300 with the steps that the MI component's server call processor uses to handle clean calls.

When the server call processor receives a clean call with a reference to a resource that the MI component manages (step 310), the server call processor decrements a corresponding reference count (step 320). The clean call may be sent to the resource, with the server call processor monitoring the resource and executing the procedure 300 to process the call. Subsequently, the server call processor sends a return call to the MI component that sent the clean call to acknowledge receipt (step 330). In accordance with this implementation of the present invention, a clean call to drop a reference may not be refused, but it must be acknowledged.

(iii) Garbage Collection

The server call processor also initiates a garbage collection cycle to reclaim resources for which it determines that either no more references are being made to the resource or that the agreed lease period for the resource has expired. The procedure 400 shown in FIG. 4 includes a flow diagram of the steps that the server call processor uses to initiate a garbage collection cycle.

The server call processor monitors reference counts and granted lease periods and determines whether a reference count is zero for a resource managed by the MI component, or the grant period for a reference has expired (step 410). When either condition exists, the server call processor initiates garbage collection (step 420) of that resource. Otherwise, the server call processor continues monitoring the reference counts and granted lease periods.

C. Call Flow

Figure 5:
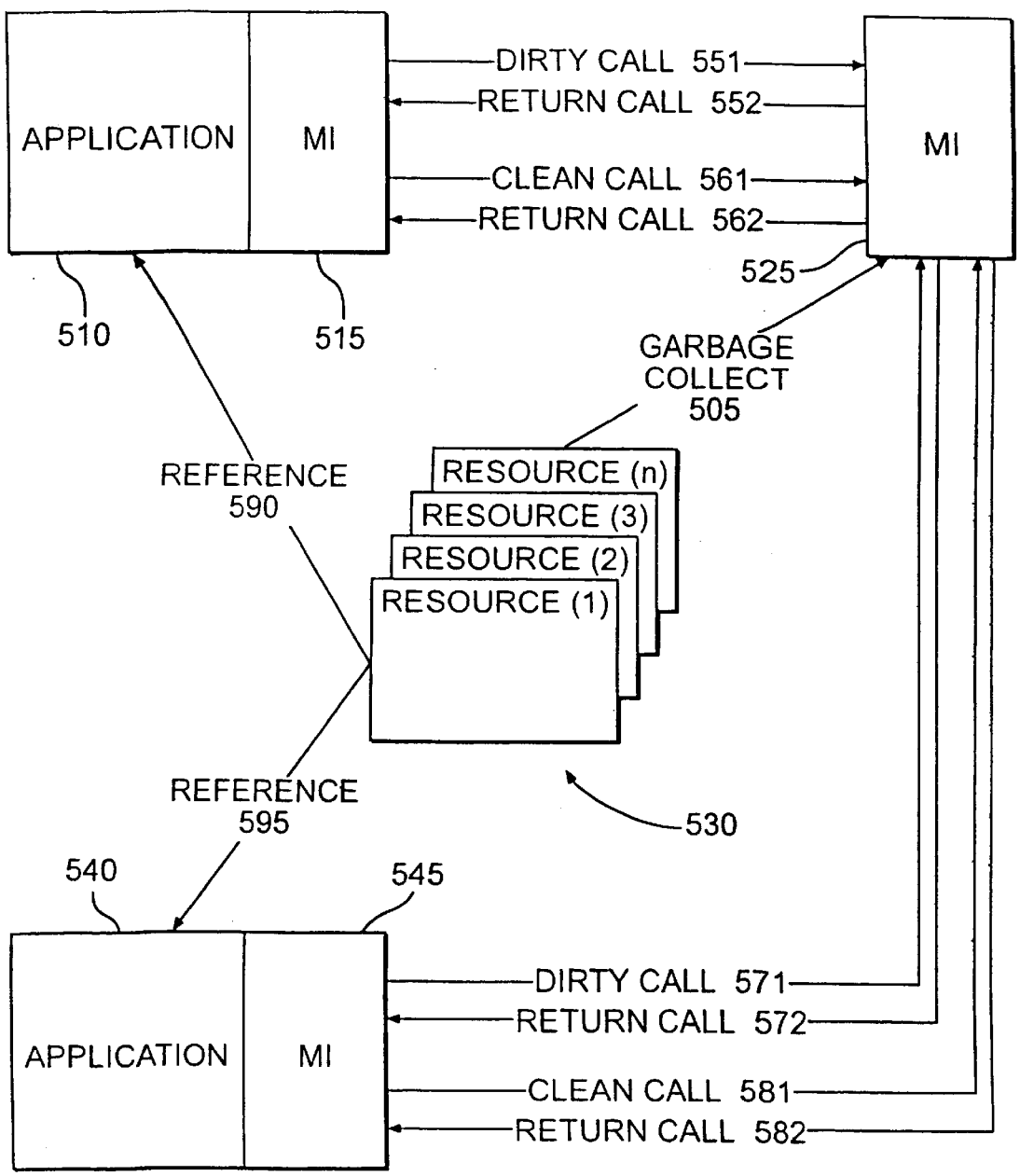
FIG. 5 is a diagram of a preferred flow of calls within a distributed processing system.

FIG. 5 is a diagram illustrating the flow of calls among MI components within the distributed processing system. Managing MI component 525 manages the resources 530 by monitoring the references to those resources 530 (see garbage collect 505). Because the managing MI components 525 manages the resources, the server call processor of managing MI component 525 performs the operations of this call flow description.

FIG. 5 also shows that applications 510 and 540 have corresponding MI components 515 and 545, respectively. Each of the applications 510 and 540 obtains a reference to one of the resources 530 and seeks to obtain access to one of the resources 530 such that a reference is bound to the corresponding resource. To obtain access, applications 510 and 540 invoke their corresponding MI components 515 and 545, respectively, to send dirty calls 551 and 571, respectively, to the MI component 525. Because the MI components 515 and 525 handle application requests for access to resources 530 managed by another MI component, such as managing MI component 525, the application call processors of MI components 515 and 545 perform the operations of this call flow description.

In response to the dirty calls 551 and 571, managing MI component 525 sends return calls 552 and 572, respectively, to each of the MI components 515 and 545, respectively. The dirty calls include granted lease periods for the references of the dirty calls 551 and 571.

Similarly, FIG. 5 also shows MI components 515 and 545 sending clean calls 561 and 581, respectively, to managing MI component 525. Clean calls 561 and 581 inform managing MI component 525 that applications 510 and 540, respectively, no longer require access to the resource specified in the clean calls 561 and 581. Managing MI component 525 responds to clean calls 561 and 581 with return calls 562 and 582, respectively. Return calls 562 and 582 differ from return calls 552 and 572 in that return calls 562 and 582 are simply acknowledgments from MI component 525 of the received clean calls 561 and 581.

Both applications 510 and 540 may request access to the same resource. For example, application 510 may request access to "RESOURCE(1)" while application 540 was previously granted access to that resource. MI component 525 handles this situation by making the resource available to both applications 510 and 540 for agreed lease periods. Thus, MI component 525 will not initiate a garbage collection cycle to reclaim the "RESOURCE(1)" until either applications 510 and 540 have both dropped their references to that resource or the latest agreed periods has expired, whichever event occurs first.

By permitting more than one application to access the same resource simultaneously, the present invention also permits an application to access a resource after it sent a clean call to the managing MI component dropping the reference to the resource. This occurs because the resource is still referenced by another application or the reference's lease has not yet expired so the managing MI component 525 has not yet reclaimed the resource. The resource, however, will be reclaimed after a finite period, either when no more applications have leases or when the last lease expires.

D. MI Components

Figure 6:
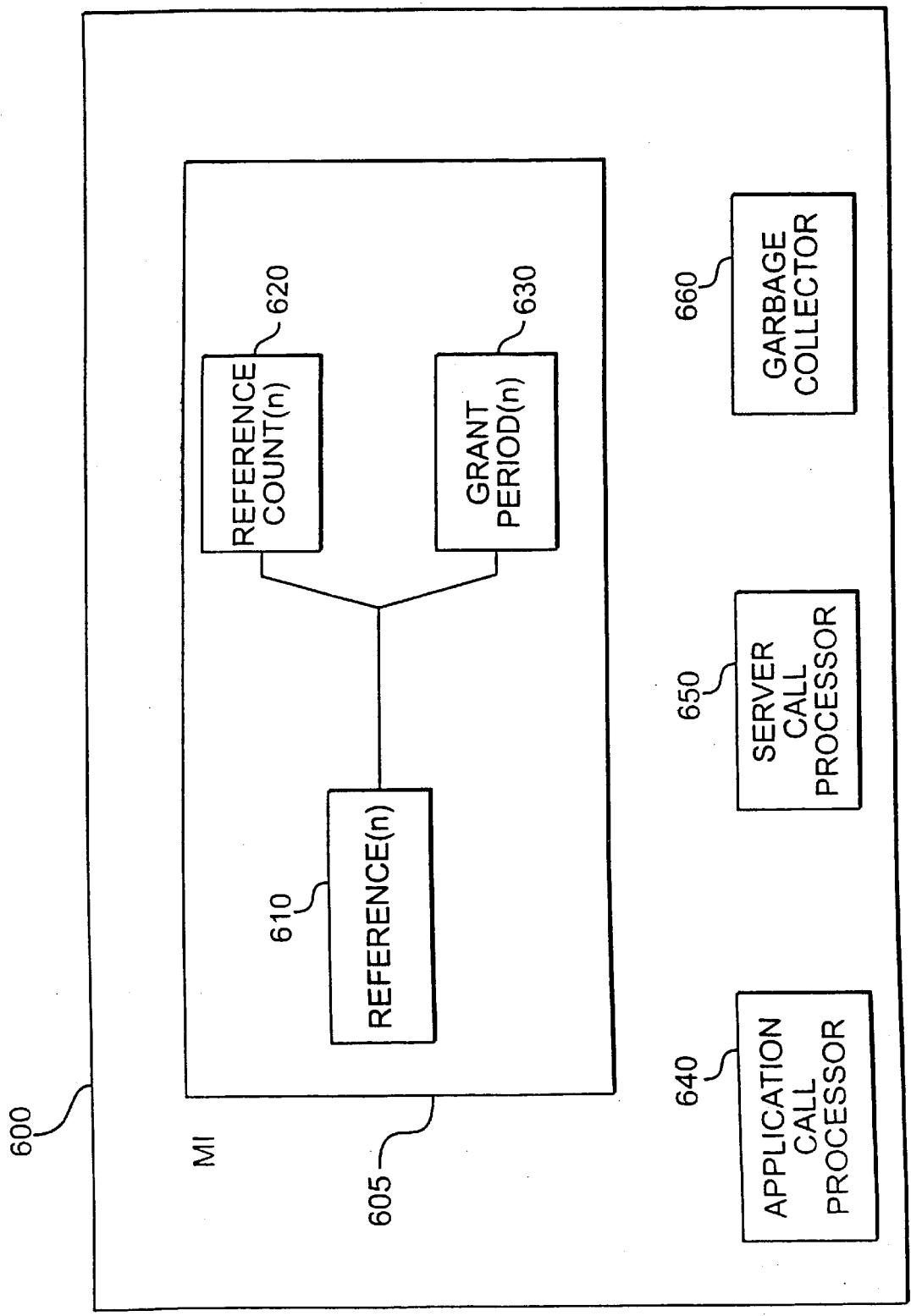
FIG. 6 is a block diagram of the components of the implementation of a method invocation service according to the present invention.

FIG. 6 is a block diagram of the modules of an MI component 600 according to an implementation of the present invention. MI component 600 can include a reference component 605 for each reference monitored, application call processor 640, server call processor 650, and garbage collector 660.

Reference component 605 preferably constitutes a table or comparable structure with reference data portions 610, reference count 620, and grant period register 630. MI component 600 uses the reference count 620 and grant period 630 for each reference specified in a corresponding reference data portion 610 to determine when to initiate garbage collector 660 to reclaim the corresponding resource.

Application call processor 640 is the software module that performs the steps of procedure 100 in FIG. 1. Server call processor 650 is the software module that performs the steps of procedures 200, 300, and 400 in FIGS. 2–4. Garbage collector 660 is the software module that reclaims resources in response to instructions from the server call processor 650, as explained above.

E. Distributed Processing System

Figure 7:
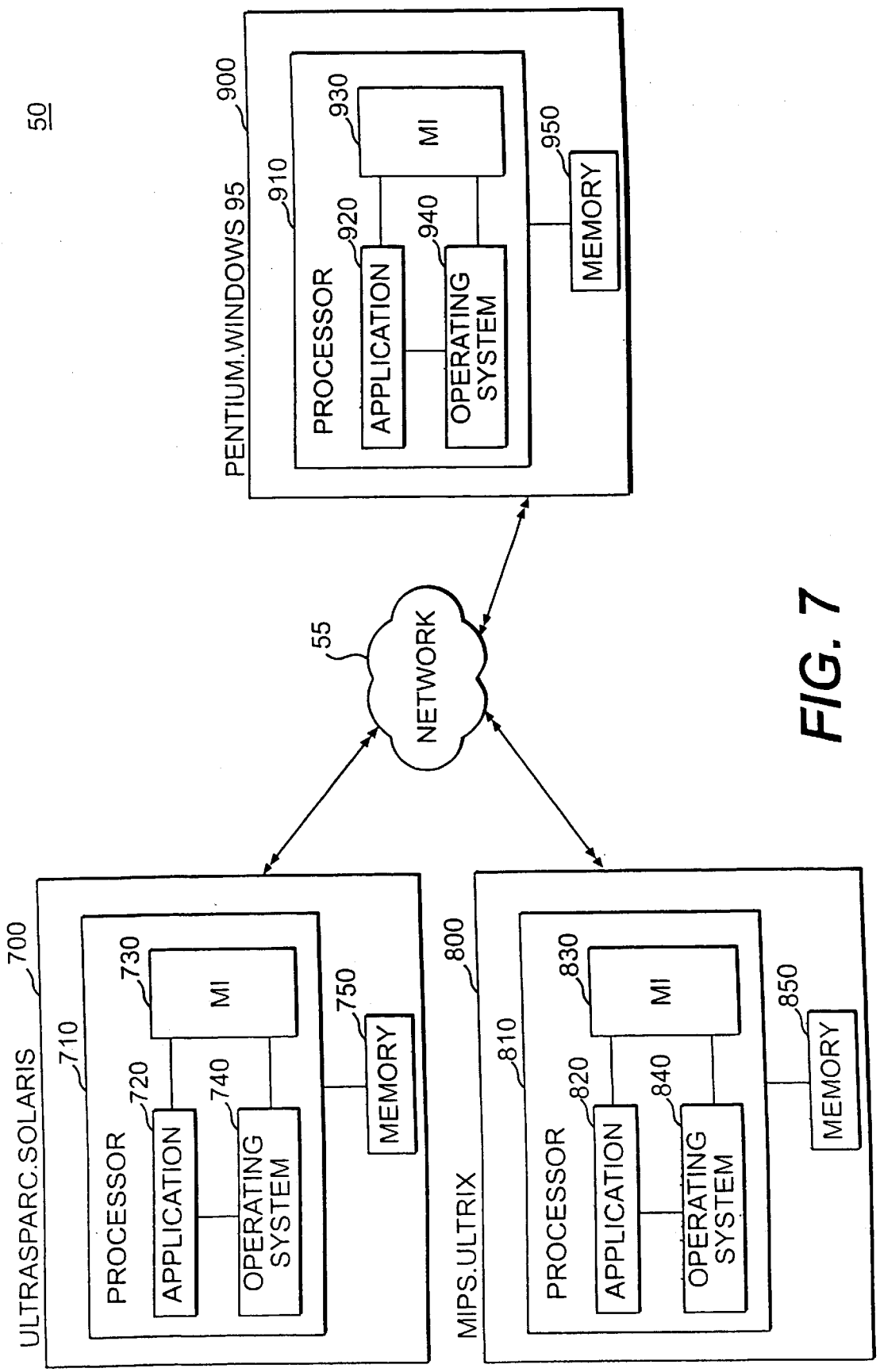
FIG. 7 is a diagram of a distributed processing system that can be used in an implementation of the present invention.

FIG. 7 illustrates a distributed processing system 50 which can be used to implement the present invention. In FIG. 7, distributed processing system 50 contains three independent and heterogeneous platforms 100, 200, and 300 connected in a network configuration represented by the network cloud 55. The composition and protocol of the network configuration represented in FIG. 7 by the cloud 55 is not important as long as it allows for communication of the information between platforms 700, 800 and 900. In addition, the use of just three platforms is merely for illustration and does not limit the present invention to the use of a particular number of platforms. Further, the specific network architecture is not crucial to this invention. For example, another network architecture that could be used in accordance with this invention would employ one platform as a network controller to which all the other platforms would be connected.

In the implementation of distributed processing system 50, platforms 700, 800 and 900 each include a processor 710, 810, and 910 respectively, and a memory, 750, 850, and 950, respectively. Included within each processor 710, 810, and 910, are applications 720, 820, and 920, respectively, operating systems 740, 840, and 940, respectively, and MI components 730, 830, and 930, respectively.

Applications 720, 820, and 920 can be programs that are either previously written and modified to work with the present invention, or that are specially written to take advantage of the services offered by the present invention. Applications 720, 820, and 920 invoke operations to be performed in accordance with this invention.

MI components 730, 830, and 930 correspond to the MI component 600 discussed above with reference to FIG. 6.

Operating systems 740, 840, and 940 are standard operating systems tied to the corresponding processors 710, 810, and 910, respectively. The platforms 700, 800, and 900 can be heterogenous. For example, platform 700 has an UltraSparc® microprocessor manufactured by Sun Microsystems Corp. as processor 710 and uses a Solaris® operating system 740. Platform 800 has a MIPS microprocessor manufactured by Silicon Graphics Corp. as processor 810 and uses a Unix operating system 840. Finally, platform 900 has a Pentium microprocessor manufactured by Intel Corp. as processor 910 and uses a Microsoft Windows 95 operating system 940. The present invention is not so limited and could accommodate homogeneous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 750, 850, and 950 serve several functions, such as general storage for the associated platform. Another function is to store applications 720, 820, and 920, MI components 730, 830, and 930, and operating systems 740, 840, and 940 before execution by the respective processor 710, 810, and 910. In addition, portions of memories 750, 850, and 950 may constitute shared memory available to all of the platforms 700, 800, and 900 in network 50.

E. MI Services

The present invention may be implemented using a client/server model. The client generates requests, such as the dirty calls and clean calls, and the server responds to requests.

Figure 8:
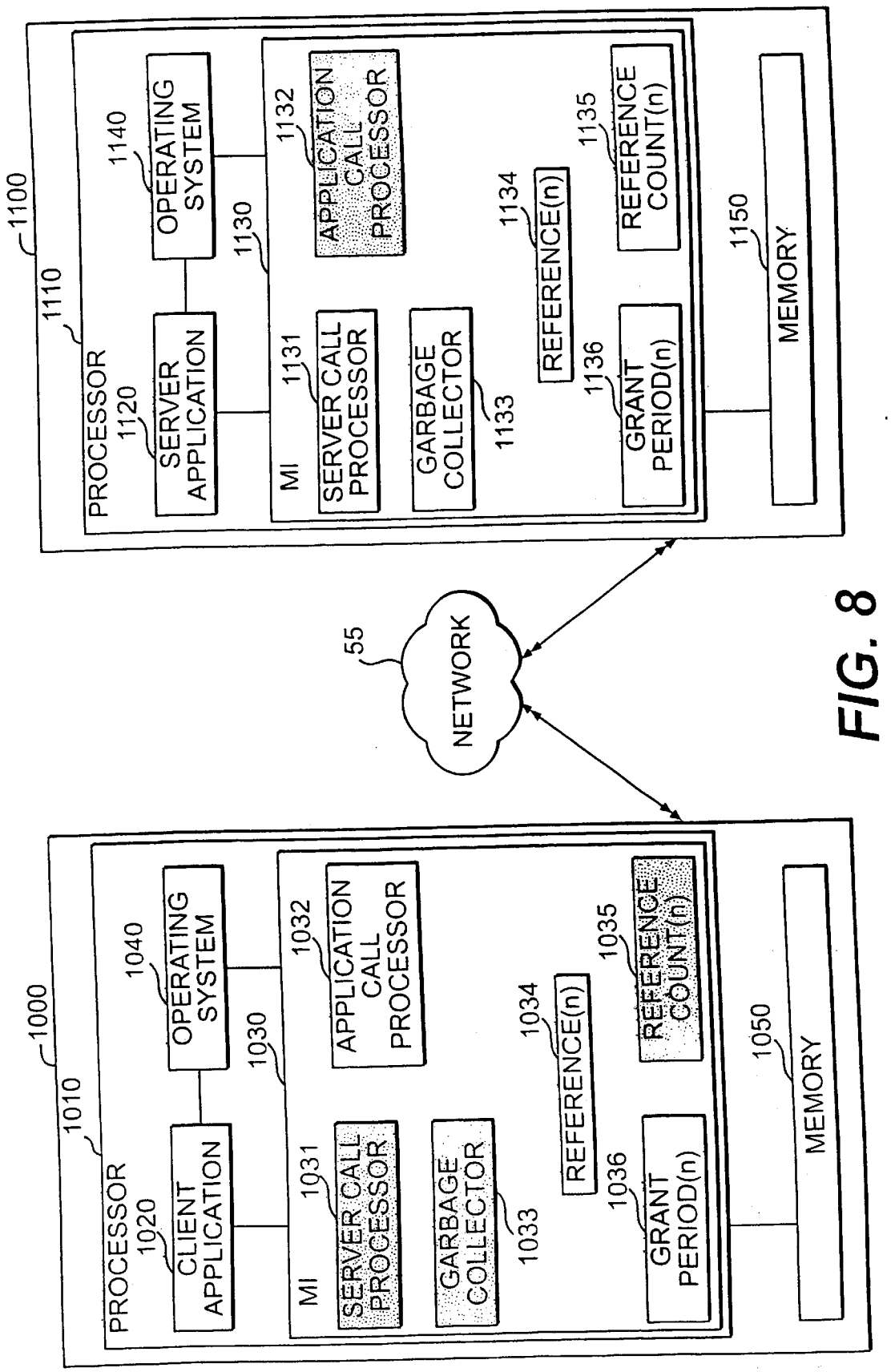
FIG. 8 is a diagram of the individual software components in the platforms of the distributed processing system according to the implementation of the present invention.

Each of the MI components 730, 830 and 930 shown in FIG. 7 preferably includes both client components and server components. FIG. 8, which is a block diagram of a client platform 1000 and a server platform 1100, applies to any two of the platforms 700, 800, and 900 in FIG. 7.

Platforms 1000 and 1100 contain memories 1050 and 1150, respectively, and processors 1010 and 1110, respectively. The elements in the platforms 1000 and 1100 function in the same manner as similar elements described above with reference to FIG. 7. In this example, processor 1010 executes a client application 1020 and processor 1110 executes a server application 1120. Processors 1010 and 110 also execute operating systems 1040 and 1140, respectively, and MI components 1030 and 1130, respectively.

MI components 1030 and 1130 each include a server call processor 1031 and 1131, respectively, an application call processor 1032 and 1132, respectively, and a garbage collector 1033 and 1133, respectively. Each of the MI components 1030 and 1130 also contains reference components, including reference data portions 1034 and 1134, respectively, reference counts 1035 and 1135, respectively, and grant period registers 1036 and 1136, respectively, for each reference that the respective MI component 1030 or 1130 monitors.

Application call processors 1032 and 1132 represent the client service and communicate with server call processors 1031 and 1131, respectively, which represent the server service. Because platforms 1000 and 1100 contain a server call processor, an application call processor, a garbage collector, and reference components, either platform can act as a client or a server.

For purposes of the discussion that follows, however, platform 1000 is designated the client platform and platform 1100 is designated as the server platform. In this example, client application 1020 obtains references to distributed resources and uses MI component 1030 to send dirty calls to the resources managed by MI component 1130 of server platform 1100.

Additionally, server platform 1100 may be executing a server application 1120. Server application 1120 may also use MI component 1130 to send dirty calls, which may be handled by MI component 1130 when the resources of those dirty calls are managed by MI component 1130. Alternatively, server application 1120 may use MI component 1130 to send dirty calls to resources managed by MI component 1030.

Accordingly, server call processor 1031, garbage collector 1033, and reference count 1035 for MI component 1030 of client platform 1000 are not active and are therefore presented in FIG. 8 as shaded. Likewise, application call processor 1132 of MI component 1130 of the server platform 1100 is shaded because it is also dormant.

When client application 1020 obtains a reference corresponding to a resource, application call processor 1032 sends a dirty call, which server call processor 1131 receives. The dirty call includes a requested lease period. Server call processor 1131 increments the reference count 1135 for the reference in the dirty call and determines a grant period. In response, server call processor 1131 sends a return call to application call processor 1030 with the grant period. Application call processor 1032 uses the grant period to update recorded grant period 1035, and to determine when the resource corresponding to the reference of its dirty call may be reclaimed.

Server call processor 1131 also monitors the reference counts and grant periods corresponding to references for resources that it manages. When one of its reference counts 1135 is zero, or when the grant period 1135 for a reference has expired, whichever event occurs first, server call processor 1131 may initiate the garbage collector 1133 to reclaim the resource corresponding to the reference that has a reference count of zero or an expired grant period.

The leased-reference scheme according to the implementation of the present invention does not require that the clocks on the platforms 1000 and 1100 involved in the protocol be synchronized. The scheme merely requires that they have comparable periods of increase. Leases do not expire at a particular time, but rather expire after a specific time interval. As long as there is approximate agreement on the interval, platforms 1000 and 1100 will have approximate agreement on the granted lease period. Further, since the timing for the lease is, in computer terms, fairly long, minor differences in clock rate will have little or no effect.

The transmission time of the dirty call can affect the protocol. If MI component 1030 holds a lease to reference and waits until just before the lease expires to request a renewal, the lease may expire before the MI component 1130 receives the request. If so, MI component 1130 may reclaim the resource before receiving the renewal request. Thus, when sending dirty calls, the sender should add a time factor to the requested lease period in consideration of transmission time to the platform handling the resource of a dirty call so that renewal dirty calls may be made before the lease period for the resource expires.

F. Conclusion

In accordance with the present invention a distributed garbage collection scheme ensures referential integrity and eliminates memory leaks by providing granted lease periods corresponding to references to resources in the distributed processing system such that when the granted lease periods expire, so do the references to the resources. The resources may then be collected. Resources may also be collected when they are no longer being referenced by processes in the distributed processing system with reference to counters assigned to the references for the resources.

Alternative Embodiment of the Present Invention

The leasing technique, described above, relates to garbage collection. However, an alternative embodiment of the present invention, as described below, can be used with storage devices.

Storage devices have many storage locations containing various logical groupings of data that may be used by more than one program. These logical groupings may take the form of files, databases, or documents. The leasing of storage locations allows access (e.g., read and write access) to the storage locations for a pre-negotiated amount of time. It is immaterial to the leasing of storage locations what kind of data is contained in the storage locations or whether the storage locations contain any data at all. Also, the leasing of storage locations can be applied on different levels of storage, such as database fields, files, blocks of storage, or actual storage locations.

In a computer system or a distributed system, many programs may compete for files stored in various groups of storage locations. Thus, groups of storage locations may have many programs vying for access. The leasing technique can be used to arbitrate the use of storage locations in such an environment.

When using a lease for a group of storage locations containing the data for a file, a program ("the client") requests a lease from the file system manager ("the server") to access the group of storage locations for a period of time ("the lease period"). Depending on availability, priority, and other factors described below, the server either denies the request or grants a lease period. The lease period granted may be either the entire lease period requested or some portion of it. Once a client receives a lease, the client may access the group of storage locations for the lease period.

When requesting a lease period, the client may request an exact lease period. In this situation, the server only grants the lease if the lease period would be the entire lease period requested, as opposed to a portion of it.

While a lease is active, the client is guaranteed access to the group of storage locations and may perform read and write operations on them. And, likewise, the server, during an active lease, will maintain the storage locations' integrity. For example, during the lease period, the server will not allow the leased file to be deleted, written over, or otherwise affected by any entity other than the client. After a lease expires, however, the server no longer guarantees the integrity of the file to the client, and thus, the server may delete the file or otherwise materially change it, or grant a lease to another client that may do the same. Storage locations with no outstanding leases are reclaimed by the server.

Each storage location may have an associated limiting parameter, such as an access parameter or a privilege parameter. The access parameter determines the type of access the server supports for that storage location. For example, a storage location may be defined as read-access only. In this case, the server only allows read access for a subsequently granted lease for that particular storage location. Conversely, an attempt by the client to write to that storage location would not be permitted by the server. Other potential storage location access parameters may include write access, allocation access, re-allocation access, and sub-block access (i.e., for large blocks of storage).

The associated privilege parameter specifies the privilege level the client must have before a lease will be granted. The server may use the privilege parameter to prioritize competing lease requests. In other words, when the server has multiple outstanding lease requests for the same storage location, it may prioritize the requests based on the privilege level of the clients making the request.

The alternative embodiment also supports concurrent access to a group of storage locations by granting multiple, concurrent leases to the same storage location. For example, if a particular storage location's parameter specifies "read" access, the server can grant multiple concurrent leases to that storage location without breaching the integrity of the storage location. Concurrent leases could also be applied, for example, to large files. The server could merely grant leases to smaller sub-blocks of the file, again, without compromising the integrity of the larger file.

Once the client requests a lease, the server returns to the client an object, including methods for determining the duration of the lease, for renewing the lease, and for canceling the lease. The object is an instance of a class that may be extended in many ways to offer more functionality, but the basic class is defined as follows:

```
interface Lease {
    obj FileHandle;
    public long getDuration ();
    public void cancel () throws UnknownLeaseException,
                    RemoteException;
    public void renew (long renewDuration) throws
                    LeaseDeniedException,
                    UnknownLeaseException,
                    RemoteException;
}
```

Specifically, invoking the "getDuration" method provides the client with the length of the granted lease period. This period represents the most recent lease granted by the server. It is the client's responsibility, however, to determine the amount of time outstanding on the lease.

The "renew" method permits the client to renew the lease, asking for more time, without having to re-initiate the original lease request. Situations where the client may desire to renew the lease include when the original lease proves to be insufficient (i.e., the client requires additional use of the storage location), or when only a partial lease (i.e., less than the requested lease) was granted.

The client may use the renew method to request an additional lease period, or the client may continually invoke the renew method multiple times until many additional lease periods are granted. The renew method has no return value; if the renewal is granted, the new lease period will be reflected in the lease object on which the call was made. If the server is unable or unwilling to renew the lease, the reason is set forth in the LeaseDeniedException generated by the renew method.

Finally, the client invokes the "cancel" method when the client wishes to cancel the lease, but there is still time left on the lease. Thus, cancel allows the server to re-claim the storage locations so that other programs make access them. Accordingly, the cancel method ensures that the server can optimize the use of the storage locations in the distributed system. In contrast, upon the end of a lease (i.e., natural termination), the server knows to take back control of storage locations. Therefore, the client has no obligation to notify the server upon the natural termination of the lease.

Figure 9:
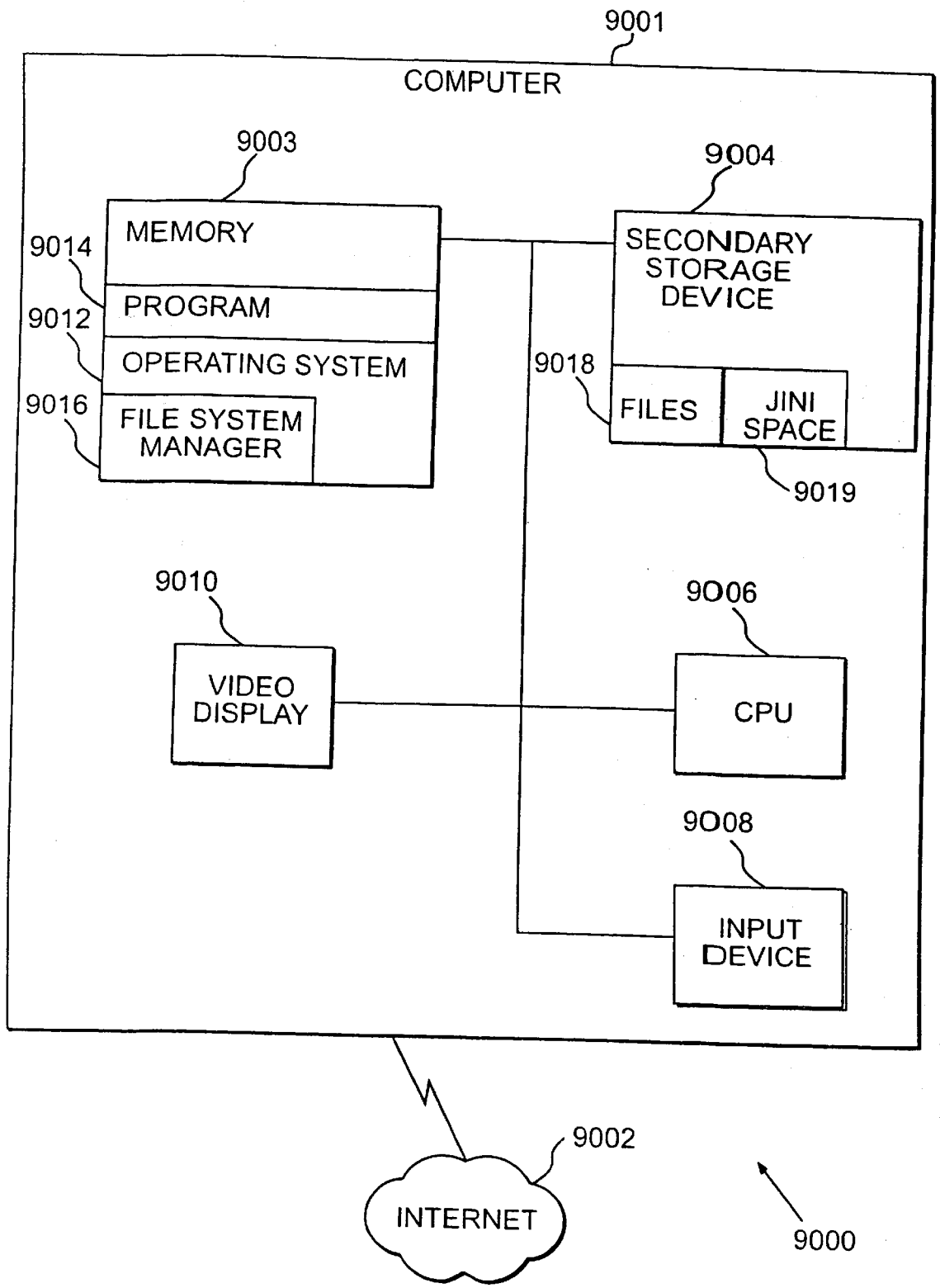
FIG. 9 is a diagram of a data processing system for leasing storage locations in a distributed processing system that can be used in an alternative embodiment of the present invention.

FIG. 9 depicts a data processing system 9000 suitable for use by an alternative embodiment of the present invention. The data processing system 9000 includes a computer system 9001 connected to the Internet 9002. The computer system 9001 includes a memory 9003, a secondary storage device 9004, a central processing unit (CPU) 9006, an input device 9008, and a video display 9010. The memory 9003 further includes an operating system 9012 and a program ("the client") 9014. The operating system 9012 contains a file system manager ("the server") 9016 that manages files 9018 on the secondary storage device 9004. The client 9014 requests access to one or more of the files 9018 by requesting a lease from the server 9016. In response, the server 9016 may either choose to grant or deny the lease as farther described below. One skilled in the art will appreciate that computer 9000 may contain additional or different components.

Although aspects of the alternative embodiment are described as being stored in memory 9003, one skilled in the art will appreciate that these aspects may also be stored in other computer-readable media, such as secondary storage devices, like hard disks, floppy disks, or CD-Rom; a carrier wave from the Internet 9002; or other forms of RAM or ROM. Additionally, one skilled in the art will appreciate that the alternative embodiment can be used to lease other forms of data in secondary storage, like databases, spreadsheets, and documents.

Figure 10A:
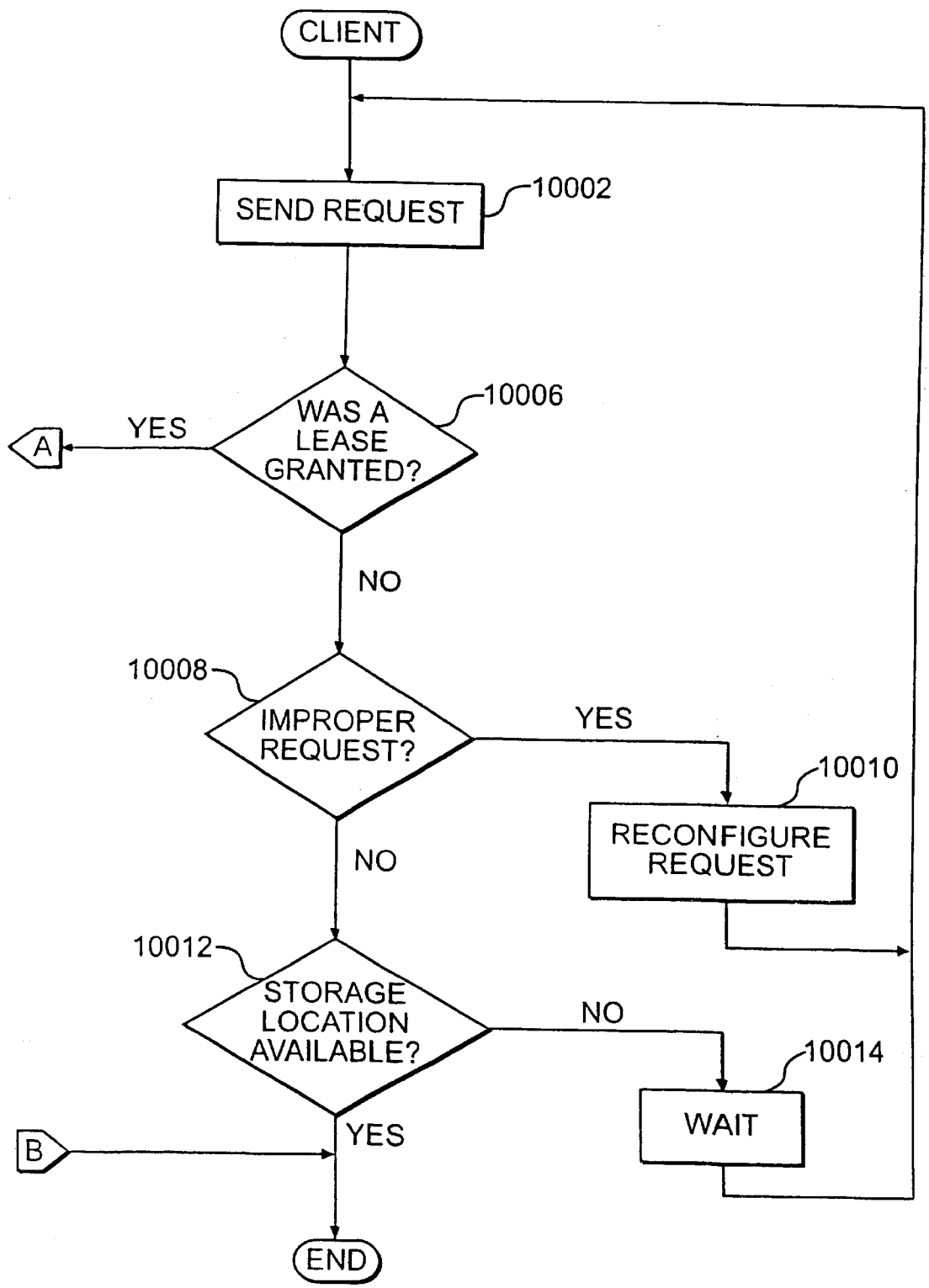
FIG. 10A and FIG. 10B represent a flow diagram of the steps performed by a client when requesting a lease from a server according to an alternative embodiment of the present invention.
Figure 10B:
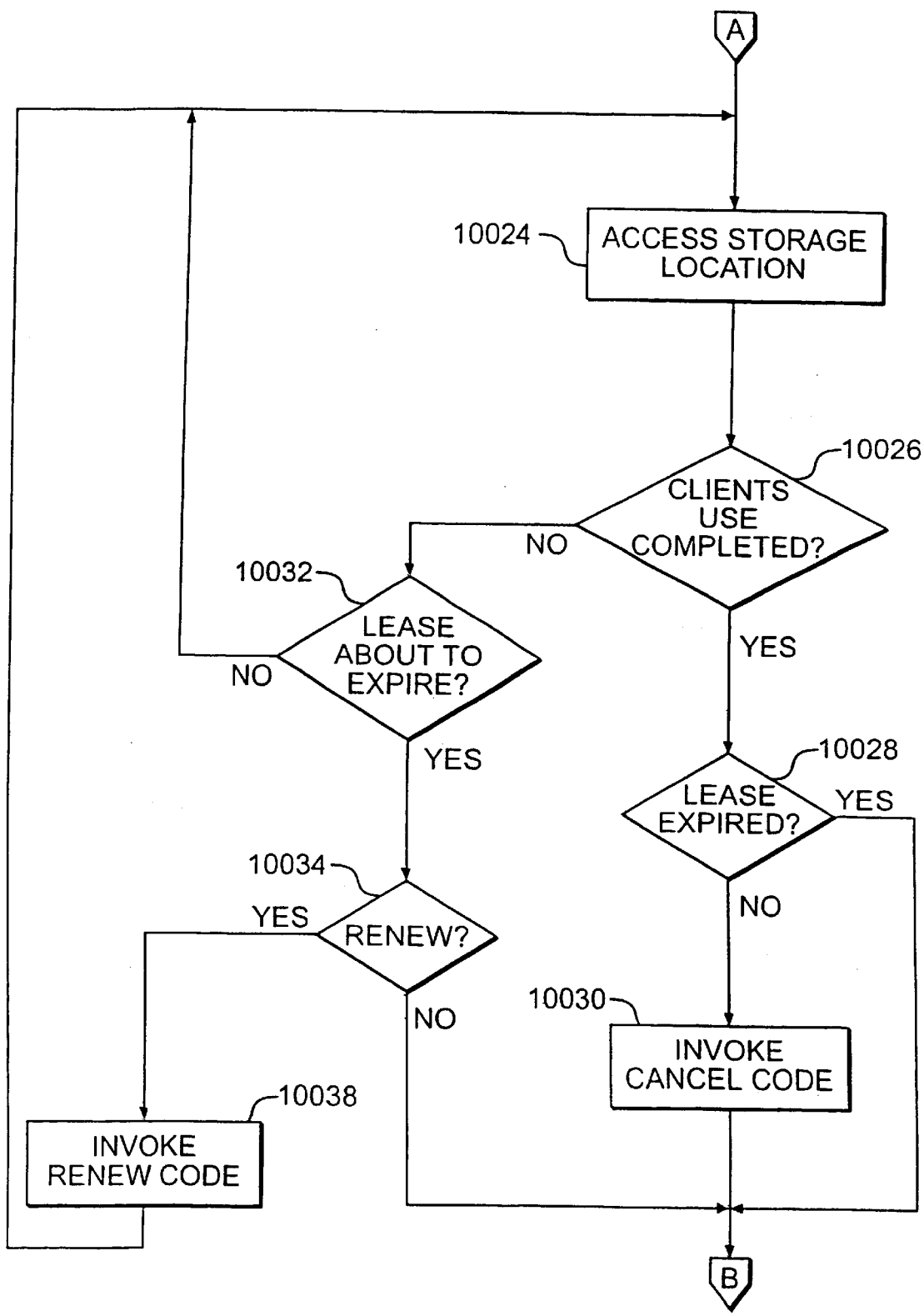

FIGS. 10A and 10B depict a flowchart of the steps performed by the client when requesting a lease from the server. The first step performed by the client is to send a request for a lease to the server (step 10002). This request is a function call that includes a number of parameters, including (1) the requested storage locations the client wishes to lease, (2) the desired lease period, (3) an exact lease indicator, (4) the type of access the client desires, and (5) the client's privilege.

The requested storage location contains an indication of the storage locations to be leased. The desired lease period contains an amount of time that the client wants to utilize the storage locations. The exact lease request contains an indication of whether an exact lease request is being made or whether a lease of less than the requested amount will suffice. The type of access requested indicates the type of storage location access the client requested. The types of access include read access, write access, allocation access, re-allocation access, and sub-block access (i.e., for large blocks of storage). The privilege field indicates the privilege level of the user or the client. To form a valid request, the client request must contain both the requested storage location and the desired lease period.

There are two general scenarios that generate a lease request for storage locations. The first scenario occurs when a file is created. The creation command used to create the file also generates a lease request to the server for access to the file. The requirement that a new file be regulated by the lease technique ensures that storage locations do not remain unaccounted for. Thus, the server would not be inclined to grant long or indefinite leases for new files. The second scenario occurs when a client desires access to existing storage locations or a file already having an existing lease (i.e., in the case of concurrent leases).

After sending the request, the client determines if a lease was granted by whether it receives a lease object from the server (step 10006). The lease object contains, various information, as described above, including the file handle, the getDuration method, the renew method, and the cancel method. It should be noted that if the server rejects the lease for any reason, the server generates an exception, which is handled by various exception handlers of the client.

If a lease was not granted because of an improper request (step 10008), an exception handler of the client is invoked that reconfigures the request (step 10010) and processing continues to step 10002. An improper request includes lease period requests that are too large or lease requests for an unknown storage location. If the request was improper, the client reconfigures the request to create a valid request. For example, if the server was unable to grant an exact lease request, the client may reconfigure the request to reflect a lesser lease period, or if the request was for an unknown storage location, the client may reconfigure the request to reflect a known storage location.

However, if the lease was not granted because the storage location is being leased by another client (step 10012), an exception handler is invoked that waits a predetermined amount of time (step 10014) and processing continues to step 10002.

An alternative, however, is that the server may queue lease requests. In this case, after waiting a predetermined amount of time, the client determines if it received a response indicating that the lease has been granted. If a lease is subsequently granted, processing continues to step 10024 in FIG. 10B. If a lease is not granted, the client waits and then continues to step 10002.

If the client determines the lease request was successful in step 10006, the client has an active lease. At this point, the client may access the storage locations covered by the lease (step 10024). After accessing the storage locations, the client determines if it is finished accessing the storage locations (step 10026). If the client is finished accessing the storage locations, the client determines if the lease expired (step 10028). If the lease expired, processing ends and no communication is necessary between the client and the server (i.e., natural termination occurred). Otherwise, if the lease is still active, the client invokes the cancel method (step 10030). The client does this for optimization purposes. The client accesses the cancel method via the lease object. The cancel method informs the server that the client is no longer interested in the storage locations. Accordingly, the cancel method allows the server to reclaim the storage location for use by other programs in an expeditious fashion.

If the client's use of the leased file is not completed, the client determines if the lease is about to expire (step 10032). This is achieved by the client comparing the current time with the duration of the lease. The duration of the lease is found by invoking the getDuration method. If the lease is not about to expire, the client may continue to access the storage location in step 10024. However, if the lease is about to expire, the client must decide whether or not to renew the lease (step 10034). If the client chooses to renew the lease, the client invokes the renew method of the lease object. If the renew method is invoked, processing continues to step 10024. If the client does not renew the lease, the processing ends and no communication is necessary between the client and the server (i.e., natural termination).

Figure 11:
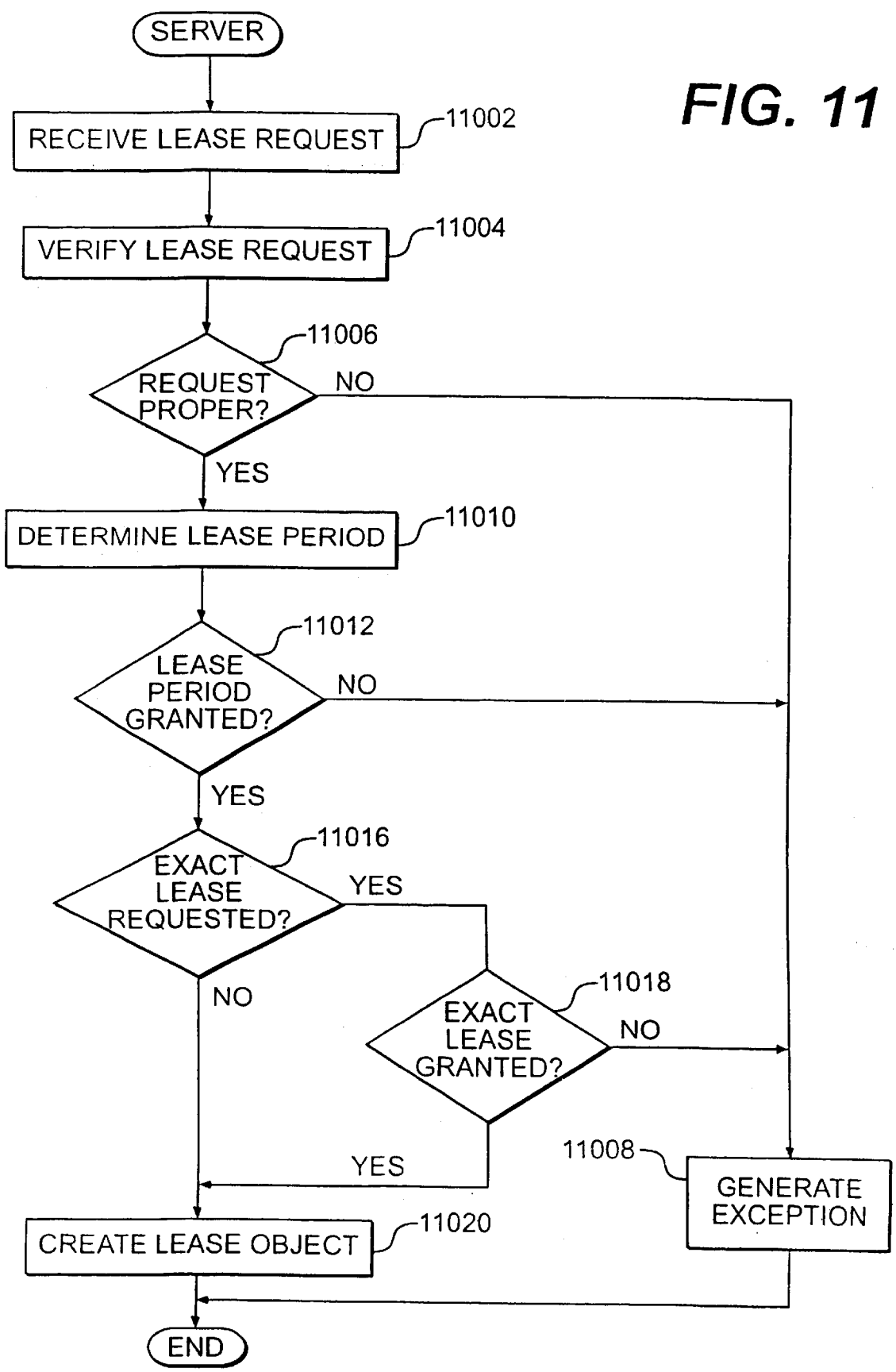
FIG. 11 is a flow diagram of the steps performed by a server when a client requests a lease according to an alternative embodiment of the present invention.

FIG. 11 depicts a flow chart of the steps performed by the server when a client requests a lease. These steps may be invoked when a client creates a file, requests a lease on a file that already has one, or invokes the renew method. The first step performed by the server is to receive a lease request by the client (step 11002). After receiving the request, the server examines the parameters to verify the propriety of the request (step 11004).

After examining the parameters, the server determines if the request is proper (step 11006). For example, the server checks if the requested storage location is, in fact, an actual storage location and if the client possesses a sufficient privilege level. Also, the server verifies that a desired lease period is specified. Additionally, the server checks if the type of access requested is available. If the server determines that the lease request is improper, the server generates an exception and invokes the appropriate client event handler (step 11008) and processing ends.

If the request is proper, the server executes the lease period algorithm ("LPA") to determine the lease period that should be granted (step 11010). The LPA produces a lease period that can range from the client's desired lease period to no lease at all. The LPA considers many factors in determining a lease period, these factors include, whether the request initiated from a renew method, a create instruction or a subsequent lease request, the client's usage patterns, the demand of the storage location, and the size of the storage locations, (if access to a large grouping is requested). Additionally, the LPA may consider the value of the storage locations. For example, if a particular storage location is very expensive to access or in high demand, the LPA may grant only short leases.

Once the LPA determines the lease period, the server determines if a lease period was granted (i.e., greater than zero) (step 11012). If no lease period was granted, the server generates an exception (step 11008) and processing ends. As described above, an alternative is that the server may queue lease requests. In this case, the server stores the lease requests for later processing.

If the LPA did grant a lease period, the server determines if an exact lease was requested by the client (step 11016). If an exact lease was requested by the client, the server determines if the lease period granted by the LPA is less than the requested lease period (step 11018). If the lease granted by the LPA is less than the exact requested lease period, the server generates an exception (step 11008) and processing ends.

If an exact lease was not requested or an exact lease was granted, the server creates a lease object and returns it to the client (step 11020). It should be noted that the server, by monitoring active lease periods, reclaims leased storage locations that no longer have any active leases pertaining to them.

The foregoing description of an implementation of the invention has been presented for purposes of illustration and description. It is not exhaustive and does not limit the invention to the precise from disclosed. Modifications and variations are possible in light of the above teachings or may be acquired from practicing of the invention. For example, the described implementation includes software but the present invention may be implemented as a combination of hardware and software or in hardware alone. The scope of the invention is defined by the claims and their equivalents.

What is claimed is:

1. A method performed by a server, comprising:

receiving a request for a lease for accessing a resource from each of a first and second client;

providing, to the first client, a first lease object for managing a first lease for accessing the resource; and providing, to the second client, a second lease object for managing a second lease for accessing the resource.

2. The method of claim 1, wherein the first and second leases are for accessing a common memory location in the resource.

3. The method of claim 1, wherein the first and second leases are for accessing different memory locations in the resource, respectively.

4. The method of claim 1, further comprising:
receiving, from either the first and second client, an unsolicited request to renew their respective lease; and
renewing either the first and second lease for the first and second client, respectively, based on the received request.

5. A method performed by a first client, comprising:
providing a request for a lease for utilizing a resource associated with a second lease granted to a second client, the resource being remote with respect to the second client; and
receiving a lease object for managing a first lease associated with the resource.

6. The method of claim 5, further comprising:
determining whether the first lease is about to expire; and
renewing at least the first and second lease based on the determination.

7. A method for utilizing a memory location, comprising:
providing, from a first process to a second process, a request for a lease associated with the memory location;
determining, by the second process, a lease period during which the first process may utilize the memory location; and
providing, by the second process to the first process, a lease object that enables the first process to manage the lease associated with the memory location.

8. The method of claim 7, wherein the lease object enables the first process to provide a request to renew the lease based on a determination that the lease is about to expire.

9. The method of 7, wherein the lease object enables the first process to cancel the lease.

10. The method of claim 7, further comprising:
determining, by the first process, whether the lease is about to expire.

11. The method of claim 10, wherein determining whether the lease is about to expire comprises:
comparing a current time with a duration time value associated with the granted lease.

12. A system, comprising:
a memory including a storage location associated with a limiting parameter; and a server for
receiving, from a client, a request for a lease for accessing the storage location, determining whether the request is valid based on the limiting parameter; and providing, to the client, a lease object that enables the client to manage the lease.

13. The system of claim 12, wherein the limiting parameter is an access parameter reflecting a type of access supported by the server for the storage location.

14. The system of claim 13, wherein the server determines whether the request is valid by determining whether a type of access associated with the lease request is compatible with the type of access reflected by the access parameter.

15. The system of claim 12, wherein the limiting parameter is a privilege parameter reflecting a privilege level associated with the storage location.

16. The system of claim 15, wherein the server determines whether the request is valid by determining whether the client is associated with a privilege level compatible with the privilege level reflected by the access privilege parameter.

17. The system of claim 15, wherein the server determines whether the request is valid by determining whether a privilege level associated with the client has a higher priority than a privilege level associated with a second client that provided a request for a second lease for accessing the storage location.

18. The system of claim 12, wherein the lease object includes processes for allowing the client to determine a lease period, renewing the lease, and canceling the lease.

19. The system of claim 12, wherein the server determines a lease period during which the client may access the storage location.

20. A computer-readable medium including instructions for performing a method, when executed a server, the method comprising:
receiving a request for a lease for accessing a resource from each of a first and second client;
providing, to the first client, a first lease object for managing a first lease for accessing the resource; and
providing, to the second client, a second lease object for managing a second lease for accessing the resource.

21. The computer-readable medium of claim 20, wherein the first and second leases are for accessing a common memory location in the resource.

22. The computer-readable medium of claim 21, wherein the first and second leases are for accessing different memory locations in the resource, respectively.

23. The computer-readable medium of claim 21, wherein the method further comprises:
receiving, from either the first and second client, an unsolicited request to renew their respective lease; and
renewing either the first and second lease for the first and second client, respectively, based on the received request.

24. A computer-readable medium including instructions for performing a method, when executed by a first client, the method comprising:
providing a request for a lease for utilizing a resource associated with a second lease granted to a second client, the resource being remote with respect to the second client; and
receiving a lease object for managing a first lease associated with the resource.

25. The computer-readable medium of claim 24, the method further comprising:
determining whether the first lease is about to expire; and
renewing at least one of the first and second lease based on the determination.

26. A computer-readable medium including instructions for performing a method, when executed by a processor, for utilizing a memory location, comprising:
providing, from a first process to a second process, a request for a lease associated with the memory location;
determining, by the second process, a lease period during which the first process may utilize the memory location; and
providing, by the second process to the first process, a lease object that enables the first process to manage the lease associated with the memory location.

27. The computer-readable medium of claim 26, wherein the lease object enables the first process to provide a request to renew the lease based on a determination that the lease is about to expire.

28. The computer-readable medium of 26, wherein the lease object enables the first process to cancel the lease.

29. The computer-readable medium of claim 26, wherein the method further comprises:
    determining, by the first process, whether the lease is about to expire.

30. The computer-readable medium of claim 29, wherein determining whether the lease is about to expire comprises:
    comparing a current time with a duration time value associated with the granted lease.

31. A system, comprising:
    means for receiving a request for a lease for accessing a storage device from each of a first and second client;
    means for providing, to the first client, a first lease object for managing a first lease for accessing the storage device; and
    means for providing, to the second client, a second lease object for managing a second lease for accessing the storage device.

32. The system of claim 31, wherein the first and second leases are for accessing a common memory location in the storage device.

33. The system of claim 31, wherein the first and second leases are for accessing different memory locations in the storage device, respectively.

34. The system of claim 31, further comprising:
    means for receiving, from either the first and second client, an unsolicited request to renew their respective lease; and
    means for renewing either the first and second lease for the first and second client, respectively, based on the received request.

35. A system, comprising:
    means for providing a request for a lease for accessing a resource associated with a second lease granted to a second client, the resource being remote with respect to the second client; and
    means for receiving a lease object for managing a first lease associated with the resource.

36. The system of claim 35, further comprising:
    means for determining whether the first lease is about to expire; and
    means for renewing at least one of the first and second lease based on the determination.

37. A system for accessing a memory location, comprising:
    means for providing, from a first process to a second process, a request for a lease associated with the memory location;
    means for determining, by the second process, a lease period during which the first process has access to the memory location; and
    means for providing, by the second process to the first process, a lease object that enables the first process to manage the lease associated with the memory location.

38. The system of claim 37, wherein the lease object enables the first process to provide a request to renew the lease based on a determination that the lease is about to expire.

39. The system of 37, wherein the lease object enables the first process to cancel the lease.

40. The system of claim 37, further comprising:
    means for determining, by the first process, whether the lease is about to expire.

41. The system of claim 40, wherein the means for determining whether the lease is about to expire comprises:
    means for comparing a current time with a duration time value associated with the granted lease.

42. A method for accessing a resource in a system including a client and a server, the method performed by the server, comprising
    determining if a lease request received from the client includes a requested lease period;
    determining a lease period based on the request during which the client has access to the resource;
    determining whether the determined lease period is less than the requested lease period; and
    generating an exception when the determined lease period is less than the requested lease period.

43. The method of claim 42, wherein determining a lease period comprises:
    determining the lease period based on at least one of the source of the request, a demand associated with the resource, a usage pattern associated with the client, and a size associated with the resource.

44. The method of claim 43, wherein determining a lease period based on the source of the request comprises:
    determining the lease period based on a determination whether the lease request initiated from a renew method associated with a lease object held by the client, a create instruction, or a subsequent lease request.

45. The method of claim 42, wherein generating an exception further comprises:
    invoking an exception handler associated with the client.

46. A method for accessing a resource in a system including a client and a server, the method performed by the client, comprising:
    providing, to the server, a lease request for accessing the resource;
    determining whether the lease was granted by the server;
    reconfiguring the lease request based on the determination; and
    providing the reconfigured lease request to the server.

47. The method of claim 46, wherein reconfiguring the lease request comprises:
    reconfiguring the lease request based on the determination that an exception handler was invoked.

48. The method of claim 47, wherein the server invokes the exception handler when the lease request is not granted.

49. The method of claim 46, wherein reconfiguring the lease request comprises:
    reconfiguring the lease request for a lesser lease period than a lease period reflected in the lease request.

50. The method of claim 46, wherein reconfiguring the lease request comprises:
    reconfiguring the lease request to reflect a different resource location than that reflected in the lease request.

51. The method of claim 46, further comprising:
    receiving a lease object from the server based on the provided reconfigured lease request.

52. The method of claim 51, wherein the lease object allows the client to manage the lease for accessing the resource.

53. A system for accessing a resource, comprising
    means for determining if a lease request received from a client includes a requested lease period;
    means for determining a lease period based on the request during which the client has access to a resource;

means for determining whether the determined lease period is less than the requested lease period; and means for generating an exception in the event the determined lease period is less than the requested lease period.

54. The system of claim 53, wherein the means for determining a lease period comprises:

means for determining the lease period based on at least one of the source of the request, a demand associated with the resource, a usage pattern associated with the client, and a size associated with the resource.

55. The system of claim 54, wherein the means for determining a lease period based on the source of the request comprises:

means for determining the lease period based on a determination whether the lease request initiated from a renew method associated with a lease object held by the client, a create instruction, or a subsequent lease request.

56. The system of claim 53, wherein the means for generating an exception further comprises:

means for invoking an exception handler associated with the client.

57. A system for accessing a resource, comprising:

means for providing, to a server, a lease request for accessing a resource;

means for determining whether the lease was granted by the server;

means for reconfiguring the lease request based on the determination; and means for providing the reconfigured lease request to the server.

58. The system of claim 57, wherein the means for reconfiguring the lease request comprises:

means for reconfiguring the lease request based on the determination that an exception handler was invoked.

59. The system of claim 58, wherein the server invokes the exception handler when the lease request is not granted.

60. The system of claim 57, wherein the means for reconfiguring the lease request comprises:

means for reconfiguring the lease request for a lesser lease period than a lease period reflected in the lease request.

61. The system of claim 57, wherein the means for reconfiguring the lease request comprises:

means for reconfiguring the lease request to reflect a different resource location than that reflected in the lease request.

62. The system of claim 57 further comprising:

means for receiving a lease object from the server based on the provided reconfigured lease request.

63. A computer-readable medium including instructions for performing a method, when executed by a server, for accessing a resource, the method comprising determining if a lease request received from a client includes a requested lease period;

determining a lease period based on the request during which the client has access to the resource;

determining whether the determined lease period is less than the requested lease period; and generating an exception in the event the determined lease period is less than the requested lease period.

64. The computer-readable medium of claim 63, wherein determining a lease period comprises:

determining the lease period based on at least one of the source of the request, a demand associated with the resource, a usage pattern associated with the client, and a size associated with the resource.

65. The computer-readable medium of claim 64, wherein determining a lease period based on the source of the request comprises:

determining the lease period based on a determination whether the lease request initiated from a renew method associated with a lease object held by the client, a create instruction, or a subsequent lease request.

66. The computer-readable medium of claim 63, wherein generating an exception further comprises:

invoking an exception handler associated with the client.

67. A computer-readable medium including instructions for performing a method, when executed by a client, for accessing a resource, the method comprising:

providing a lease request for accessing the resource to a server;

determining whether the lease was granted by the server;

reconfiguring the lease request based on the determination; and providing the reconfigured lease request to the server.

68. The computer-readable medium of claim 67, wherein reconfiguring the lease request comprises:

reconfiguring the lease request based on the determination that an exception handler was invoked.

69. The computer-readable medium of claim 68, wherein the server invokes the exception handler when the lease request is not granted.

70. The computer-readable medium of claim 67, wherein reconfiguring the lease request comprises:

reconfiguring the lease request for a lesser lease period than a lease period reflected in the lease request.

71. The computer-readable medium of claim 67, wherein reconfiguring the lease request comprises:

reconfiguring the lease request to reflect a different resource location than that reflected in the lease request.

72. The computer-readable medium of claim 67, further comprising:

receiving a lease object from the server based on the provided reconfigured lease request.

73. The computer-readable medium of claim 72, wherein the lease object allows the client to manage the lease for accessing the resource.

* * * * *

UNITED STATES PATENT AND TRADEMARK OFFICE
CERTIFICATE OF CORRECTION

PATENT NO. : 6,728,737 B2
DATED : April 27, 2004
INVENTOR(S) : Ann M. Wollrath et al.

It is certified that error appears in the above-identified patent and that said Letters Patent is hereby corrected as shown below:

Column 17,
Line 41, "of 7," should read -- of claim 7, --.

Column 18,
Line 18, "executed a" should read -- executed by a --.

Column 19,
Line 3, "of 26," should read -- of claim 26, --.
Line 63, "of 37," should read -- of claim 37, --.

Signed and Sealed this

Thirteenth Day of July, 2004

JON W. DUDAS
*Acting Director of the United States Patent and Trademark Office*